(12) United States Patent
Maeda

(10) Patent No.: US 11,406,919 B2
(45) Date of Patent: Aug. 9, 2022

(54) FLOCCULATION AND SEDIMENTATION APPARATUS

(71) Applicant: ORGANO CORPORATION, Tokyo (JP)

(72) Inventor: Rintarou Maeda, Tokyo (JP)

(73) Assignee: ORGANO CORPORATION, Tokyo (JP)

(*) Notice: Subject to any disclaimer, the term of this patent is extended or adjusted under 35 U.S.C. 154(b) by 280 days.

(21) Appl. No.: 16/486,389

(22) PCT Filed: Feb. 22, 2018

(86) PCT No.: PCT/JP2018/006350
§ 371 (c)(1),
(2) Date: Aug. 15, 2019

(87) PCT Pub. No.: WO2018/155524
PCT Pub. Date: Aug. 30, 2018

(65) Prior Publication Data
US 2020/0108334 A1    Apr. 9, 2020

(30) Foreign Application Priority Data

Feb. 24, 2017   (JP) .............................. JP2017-032903
Feb. 24, 2017   (JP) .............................. JP2017-032938
(Continued)

(51) Int. Cl.
*B01D 21/06*    (2006.01)
*B01D 21/24*    (2006.01)
(Continued)

(52) U.S. Cl.
CPC ............. *B01D 21/06* (2013.01); *B01D 21/01* (2013.01); *B01D 21/08* (2013.01);
(Continued)

(58) Field of Classification Search
None
See application file for complete search history.

(56) References Cited

U.S. PATENT DOCUMENTS 4,948,518 A * 8/1990 Turgay .................. B01D 21/06
                                                      210/802
2011/0132827 A1   6/2011  Yoden et al.
2015/0298028 A1  10/2015  Shimizu et al.

FOREIGN PATENT DOCUMENTS

JP         42-25986        12/1967
JP         48-62335         8/1973
(Continued)

OTHER PUBLICATIONS

Official Communication issued in International Application No. PCT/JP2018/006350, dated May 22, 2018.

*Primary Examiner* — David C Mellon
(74) *Attorney, Agent, or Firm* — Greenblum & Bernstein, P.L.C.

(57) ABSTRACT

A flocculation and sedimentation apparatus has: sedimentation tank that causes flocs in raw water to be sedimented and separated; sludge concentration tank that is surrounded by sedimentation tank and that collects and concentrates the flocs; and raw water supply mechanism having center line that passes through sludge concentration tank, wherein raw water supply mechanism rotates about center line and supplies the raw water to sedimentation tank. Raw water supply mechanism includes: raw water introducing portion that is located on center line and to which the raw water is introduced, raw water supply port that is open at a lower portion of an inner space of sedimentation tank and that supplies the raw water to sedimentation tank, and pipe portion that communicates both with raw water introducing
(Continued)

portion and with raw water supply port and that extends above sludge concentration tank in a direction away from center line.

16 Claims, 17 Drawing Sheets

(30) Foreign Application Priority Data

Jun. 5, 2017 (JP) .............................. JP2017-111004
Sep. 21, 2017 (JP) .............................. JP2017-181261

(51) Int. Cl.
*B01D 21/01* (2006.01)
*C02F 1/52* (2006.01)
*B01D 21/08* (2006.01)
*B01F 27/90* (2022.01)
*C02F 1/00* (2006.01)

(52) U.S. Cl.
CPC .......... *B01D 21/2405* (2013.01); *B01F 27/90* (2022.01); *C02F 1/5245* (2013.01); *C02F 1/5281* (2013.01); *C02F 2001/007* (2013.01)

(56) References Cited

FOREIGN PATENT DOCUMENTS

| JP | 50-16160 | | 2/1975 |
|---|---|---|---|
| JP | 58-189008 | | 11/1983 |
| JP | 63-176503 | | 11/1988 |
| JP | 5-315375 | | 2/1993 |
| JP | 05-293349 | A | 11/1993 |
| JP | 5-317729 | | 12/1993 |
| JP | 08-071306 | A | 3/1996 |
| JP | 2001-205263 | | 7/2001 |
| JP | 2002-35503 | A | 2/2002 |
| JP | 4142321 | | 6/2008 |
| JP | 2010-184179 | | 8/2010 |
| JP | 2010-274199 | | 12/2010 |
| JP | 2012-125716 | A | 7/2012 |
| JP | 2012236121 | A  * | 12/2012 |
| JP | 2013-128903 | A | 7/2013 |
| JP | 2013-188695 | | 9/2013 |
| JP | 2014-100664 | A | 6/2014 |
| JP | 2015-181975 | | 10/2015 |
| JP | 2016-190210 | A | 11/2016 |

* cited by examiner

FLOCCULATION AND SEDIMENTATION APPARATUS

TECHNICAL FIELD

The present application is based on Japanese Patent Application No. 2017-32938 filed on Feb. 24, 2017, Japanese Patent Application No. 2017-32903 filed on Feb. 24, 2017, Japanese Patent Application No. 2017-111004 filed on Jun. 5, 2017, and Japanese Patent Application No. 2017-181261 filed on Sep. 21, 2017 and claims priority from these applications, the disclosure of which is incorporated by reference herein in its entirety.

The present invention relates to a flocculation and sedimentation apparatus, more particularly, to the configuration of a raw water supply mechanism that supplies raw water to a sedimentation tank.

BACKGROUND ART

A flocculation and sedimentation apparatus, which is one of water treatment apparatuses, is widely used for service water treatment, wastewater treatment and the like. JP4142321 (hereinafter referred to as Patent Literature 1) discloses a flocculation and sedimentation apparatus that causes suspended matters and flocs in raw water to be sedimented and separated in a sedimentation tank, forms a sludge blanket in the sedimentation tank, and thereby purifies the raw water. The sedimentation tank houses a rotating shaft that has an inner channel and that vertically extends at the center of the sedimentation tank, as well as radially extending discharge pipes that are connected to the rotating shaft. Each discharge pipe has a plurality of discharge ports along the longitudinal direction thereof. Raw water that passes through the inner channel of the rotating shaft is introduced to the discharge pipes, and is discharged from the discharge ports of the discharge pipes. Flocs, which are deposited in a sludge concentration portion provided at the lower portion of the sedimentation tank, become concentrated sludge and are periodically drawn out. However, since the sludge concentration portion is not separated from the sludge blanket, when the concentrated sludge is drawn out, the interface of the sludge blanket is lowered and becomes unstable, and the water quality of treated water may deteriorate.

JP63-176503U (hereinafter referred to as Patent Literature 2) discloses a flocculation and sedimentation apparatus having a sedimentation tank that causes flocs in raw water to be sedimented and separated, as well as a sludge concentration tank that is surrounded by the sedimentation tank and that collects and concentrates the flocs by causing the flocs to overflow from the sedimentation tank. The sedimentation tank and the sludge concentration tank are shaped in concentric circles and are arranged adjacent to each other. The sedimentation tank is separated from the sludge concentration tank. Therefore, the sludge blanket in the sedimentation tank is less affected when the concentrated sludge is drawn out from the sludge concentration tank, and the water quality of treated water is less likely to deteriorate. Raw water is supplied from a ring-shaped pipe that is connected to a supply pipe that extends through the side wall of the sedimentation tank.

SUMMARY OF INVENTION

In a flocculation and sedimentation apparatus that forms a sludge blanket in a sedimentation tank, it is important to uniformly distribute raw water in the sedimentation tank. If raw water cannot be uniformly distributed, then a biased flow of the raw water disturbs the sludge blanket. This causes fine flocs to flow out into treated water and easily worsens the water quality of the treated water. Unlike the flocculation and sedimentation apparatus disclosed in Patent Literature 1 having a rotating shaft and discharge pipes, the flocculation and sedimentation apparatus disclosed in Patent Literature 2 that uses a fixed-type ring-shaped pipe cannot uniformly distribute raw water. If some of discharge ports should partially or entirely be clogged by sludge, then raw water is supplied from the other discharge ports and raw water cannot be uniformly distributed.

Thus, a flocculation and sedimentation apparatus that will solve the problems in Patent Literatures 1 and 2 can be obtained by applying the rotating shaft and the discharge pipes disclosed in Patent Literature 1 to the flocculation and sedimentation apparatus disclosed in Patent Literature 2. However, due to the arrangement of the flocculation and sedimentation apparatus disclosed in Patent Literature 2 in which the sludge concentration tank is arranged inside the sedimentation tank, it is impossible to apply the rotating shaft and the discharge pipes disclosed in Patent Literature 1.

It is an object of the present invention to provide a flocculation and sedimentation apparatus having a sludge concentration tank that is arranged inside a sedimentation tank and that is capable of further improving the water quality of treated water.

A flocculation and sedimentation apparatus according to the present invention comprises: a sedimentation tank that causes flocs in raw water to be sedimented and separated; a sludge concentration tank that is surrounded by the sedimentation tank and that collects and concentrates the flocs by allowing the flocs to overflow from the sedimentation tank; and a raw water supply mechanism having a center line that passes through the sludge concentration tank, wherein the raw water supply mechanism rotates about the center line and supplies the raw water to the sedimentation tank. The raw water supply mechanism comprises: a raw water introducing portion that is located on the center line and to which the raw water is introduced, a raw water supply port that is open at a lower portion of an inner space of the sedimentation tank and that supplies the raw water to the sedimentation tank, and a pipe portion that communicates both with the raw water introducing portion and with the raw water supply port and that extends above the sludge concentration tank in a direction away from the center line.

According to the flocculation and sedimentation apparatus of the present invention, the sludge concentration tank is surrounded by the sedimentation tank, and the sedimentation tank is separated from the sludge concentration tank. Accordingly, the sludge blanket in the sedimentation tank is less affected when the concentrated sludge is drawn out from the sludge concentration tank, and water quality of treated water is less likely to deteriorate. Raw water can be uniformly distributed due to the rotary-type raw water supply mechanism. In addition, since raw water is supplied from the raw water supply port of the raw water supply mechanism through the pipe portion that extends above the sludge concentration tank in a direction away from the center line, interference between the raw water supply mechanism and the sludge concentration tank due to the arrangement can be prevented. According to the present invention, it is thus possible to further improve the water quality of treated water.

The above and other objects, features and advantages of the present invention will become apparent from the following description with reference to the accompanying drawings which illustrate examples of the present invention.

Figure 1:
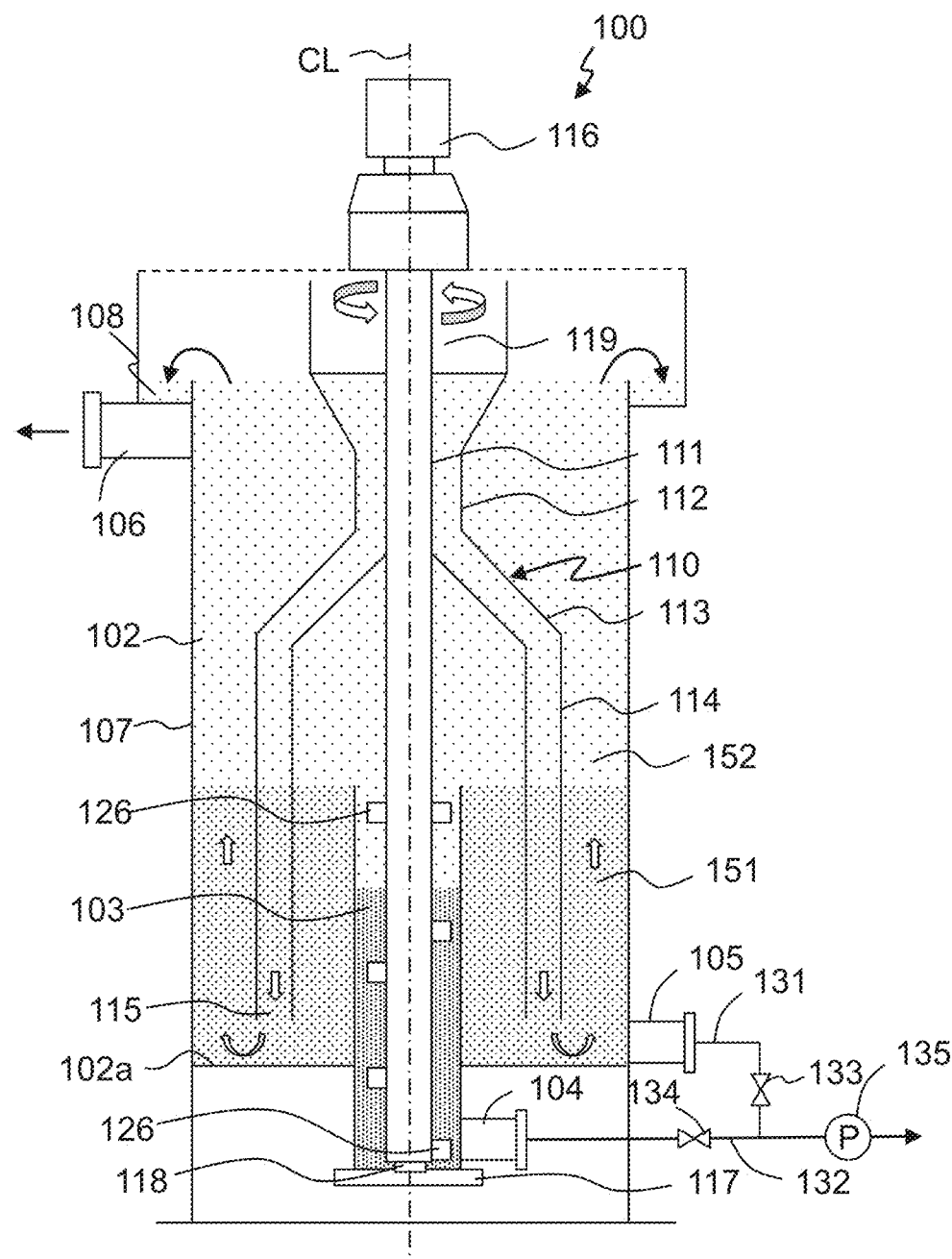
FIG. 1 is a schematic cross-sectional view of a flocculation and sedimentation apparatus according to the first embodiment.

LIST OF REFERENCE NUMERAL 0, 200, 300, 400, 500 flocculation and sedimentation apparatus
102, 301 sedimentation tank
103, 302 sludge concentration tank
110, 408 raw water supply mechanism (distributor)
111, 411 rotating shaft
112, 412 first pipe portion
113, 413 second pipe portion
114, 414 third pipe portion
115, 415 raw water supply port
119, 419 raw water introducing portion
126, 426 first agitating blade
227, 427 second agitating blade
228, 428 third agitating blade
307 fixed blade
520 sludge deposition prevention device
CL center line

DESCRIPTION OF EMBODIMENTS

Several embodiments of a flocculation and sedimentation apparatus according to the present invention will be described below with reference to the drawings. The flocculation and sedimentation apparatus according to the present invention is capable of treating any type of wastewater. Examples of wastewater that can be treated by the flocculation and sedimentation apparatus according to the present invention include: fluorine-containing wastewater that is discharged during an etching process in the electronic industry or the like; fluorine-containing desulfurized wastewater that is discharged from a thermal power plant or the like; phosphorus-containing wastewater that is discharged from a liquid crystal panel factory or a semiconductor factory; phosphorus-containing wastewater that is discharged from a sewage treatment plant; and steel-related wastewater that is discharged from a steel plant or the like. The embodiments below will describe a flocculation and sedimentation apparatus that is used to treat fluorine-containing wastewater.

Raw water is introduced to a calcium reaction tank (not shown) first. Slaked lime is added, and the raw water is agitated. Fluorine in the raw water reacts with the slaked lime to generate calcium fluoride. The raw water is then introduced to an inorganic flocculation reaction tank (not shown). An inorganic flocculant, such as polyaluminum chloride (PAC) or aluminum sulfate, is added, and the raw water is agitated. As a result, flocs are formed in the raw water. The raw water is introduced to a polymer flocculant reaction tank (not shown). A polymer flocculant, such as polyacrylamide, is added, and the raw water is agitated. This process makes the flocs coarse. The raw water treated in this manner is introduced to a flocculation and sedimentation apparatus.

First Embodiment

FIG. 1 is a schematic cross-sectional view of flocculation and sedimentation apparatus 100 according to the first embodiment of the present invention. Flocculation and sedimentation apparatus 100 has sedimentation tank 102 that causes the flocs in raw water to be sedimented and separated, as well as sludge concentration tank 103 that is surrounded by sedimentation tank 102 and that collects and concentrates the flocs. Sedimentation tank 102 and sludge concentration tank 103 each have a cylindrical shape, and have a common vertical center line CL. Sedimentation tank 102 or sludge concentration tank 103 or both may have a polygonal shape. The top of sludge concentration tank 103 is lower than the top of sedimentation tank 102 such that the flocs are collected in sludge concentration tank 103 by allowing the flocs to overflow from sedimentation tank 102. Sludge drawing nozzle 104 is provided at a lower portion of the side surface of sludge concentration tank 103. Due to the arrangement in which the bottom of sludge concentration tank 103 is lower than the bottom of sedimentation tank 102, sludge drawing nozzle 104 and drawing pipe 132 can be provided outside sedimentation tank 102. Accordingly, there is no need to provide a sludge drawing line that crosses the inner space of sedimentation tank 102. Sedimentation tank 102 has sludge drawing nozzle 105 at a lower portion of the side surface and treated water drawing nozzle 106 at the top thereof. Annular receiving tank 108 is provided outside side wall 107 of sedimentation tank 102, and treated water drawing nozzle 106 is connected to receiving tank 108. Treated water that overflows from side wall 107 is collected in receiving tank 108 before it is discharged from drawing nozzle 106. Thus, treated water present at the uppermost portion of sedimentation tank 102 can be efficiently collected.

Raw water supply mechanism 110 is provided in sedimentation tank 102. Raw water supply mechanism 110 has rotating shaft 111 that is concentric with center line CL of sludge concentration tank 103, first pipe portion 112 that surrounds rotating shaft 111 and that extends in the vertical direction along rotating shaft 111, a plurality of second pipe portions 113 that are connected to first pipe portion 112 and that extend radially outward and downward from center line CL above sludge concentration tank 103, and third pipe portions 114 that are connected to respective second pipe portions 113 and that vertically extend to respective raw water supply ports 115. Rotating shaft 111 is inserted into sludge concentration tank 103. The upper portion of rotating shaft 111 is connected to motor 116. The lower end of rotating shaft 111 is rotationally supported by bearing 118 that is supported by base plate 117 of sludge concentration tank 103. Raw water introducing portion 119 that is supported by rotating shaft 111 is provided above first pipe portion 112. First pipe portion 112 partially envelops the outer circumferential surface of rotating shaft 111. First pipe portion 112 is supported by rotating shaft 111 via raw water introducing portion 119. Two second pipe portions 113 are arranged at an interval of 180 degrees in the present embodiment, but the number of second pipe portions 113 is not limited to this, and three or more second pipe portions 113 can be provided if sedimentation tank 102 is large. Raw water can be uniformly supplied to sedimentation tank 102 by providing a plurality of second pipe portions 113. Only one second pipe portion 113 may also be provided. In this case, only one raw water supply port 115 is provided. Each raw water supply port 115 is open at the lower portion of the inner space of sedimentation tank 102, and supplies raw water to sedimentation tank 102. Raw water supply port 115 is an opening that faces downward opposite bottom 102a of sedimentation tank 102, but it also may be an opening that faces diagonally downward. Alternatively, the end portion of each third pipe portion 114 may be formed in an L-shape in order to discharge raw water laterally from raw water supply port 115. First pipe portion 112 is fixed to rotating shaft 111. As a result, raw water supply mechanism 110 turns around or rotates about center line CL, as a whole. Accordingly, even if raw water supply ports 115 of some of third pipe portions 114 should partially or wholly be clogged, raw water can be uniformly distributed due to the rotation of raw water supply mechanism 110.

Raw water that is supplied from first pipe portion 112 of raw water supply mechanism 110 diverges into a plurality of second pipe portions 113, and is supplied to sedimentation tank 102 through raw water supply ports 115 of third pipe portions 114. Because the gap between raw water supply ports 115 and bottom 102a of sedimentation tank 102 is small, raw water that is supplied from raw water supply mechanism 110 collides against bottom 102a of sedimentation tank 102 and then becomes an upward flow. The flocs in sedimentation tank 102 are suspended in sedimentation tank 102 due to the downward force caused by gravity and the upward force caused by the upward flow of the raw water that is supplied from raw water supply ports 115. Flocs that are contained in newly supplied raw water are captured by the flocs that are suspended in sedimentation tank 102 and are integrated with the flocs. Accordingly, only treated water from which a part of or all of the flocs are removed reaches the upper portion of sedimentation tank 102 in an upward flow.

As a result, a layer of the flocs (sludge blanket 151) is formed in the lower part of sedimentation tank 102, and layer 152 of treated water that is separated from sludge blanket 151 is formed in the upper part of sedimentation tank 102. The upper boundary of sludge blanket 151 gradually rises. When the upper boundary of sludge blanket 151 reaches the top of the side wall of sludge concentration tank 103, the flocs overflow from side wall 107 of sludge concentration tank 103 and are collected in sludge concentration tank 103. After that, the flocs continue to overflow from the boundary of sludge blanket 151 while the supply of raw water continues, and sludge blanket 151 is kept at a fixed height. Because fine flocs having low sedimentation velocity are suspended in the upper part of sludge blanket 151, the fine flocs overflow into sludge concentration tank 103 while large flocs having high sedimentation velocity can form sludge blanket 51. This enables the water in sedimentation tank 102 to flow at an increased linear velocity. Since there is no upward flow of raw water in sludge concentration tank 103, the flocs are sedimented in sludge concentration tank 103 due to gravity and become concentrated sludge. The concentrated sludge is drawn out through drawing nozzle 104.

Sludge drawing line 132 is connected to sludge drawing nozzle 104, and sludge drawing line 131 is connected to sludge drawing nozzle 105. First valve 134 is provided on sludge drawing line 132, and second valve 133 is provided on sludge drawing line 131. Sludge drawing lines 131 and 132 merge together, and sludge drawing pump 135 is provided downstream thereof. Normally, first valve 134 is open and second valve 133 is closed in order to draw out the concentrated sludge through sludge drawing nozzle 104. The sludge in sedimentation tank 102 may rot when it remains for a long time and may worsen the water quality of treated water. It is therefore desirable to periodically close first valve 134 and open second valve 133 in order to draw out the sludge through sludge drawing nozzle 105. This operation may be performed with sufficient intervals so as to prevent the sludge in sedimentation tank 102 from rotting. First valve 134 and second valve 133 are preferably automatic valves for shifting sludge drawing lines 131 from/to 132 by means of a timer or the like, but first valve 134 and second valve 133 may be manual valves if the sludge in the lower part of sedimentation tank 102 does not rot frequently.

Rotating shaft 111 in sludge concentration tank 103 has first agitating blades 126 on the side surface thereof. First agitating blades 126 constantly agitate the highly concentrated sludge that is deposited in sludge concentration tank 103 and prevents the adhesion of the sludge. In particular, first agitating blade 126 that is provided near the bottom of sludge concentration tank 103 has both the function of agitating the sludge that is deposited on the bottom and the function of scraping off and collecting the sludge that is deposited on the bottom. First agitating blade 126 helps discharge the sludge through sludge drawing nozzle 104 by scraping off and collecting the sludge that is deposited on the bottom of sludge concentration tank 103. First agitating blades 126 are flat plates that are fixed to rotating shaft 111, and the shape of the blades is not limited as long as they can agitate, scrape off and collect sludge. First agitating blades 126 may be parallel to or may be non-parallel to a vertical plane. In the present embodiment, first agitating blades 126 have the same structure. Since first agitating blades 126 are provided in raw water supply mechanism 110, there is no need to provide a separate power source and a separate power transmission.

The arrangement in which sludge concentration tank 103 is concentric with and located inside sedimentation tank 102 provides the following advantages. In sludge concentration tank 103, the sludge easily adheres and the sludge drawing line is easily clogged due to the highly concentrated sludge that is deposited. Therefore, sludge concentration tank 103 requires an agitating blade and a sludge scraping device. If a sludge concentration portion lies below a sludge blanket, flocs in the sludge blanket are sedimented on the concentrated sludge upon stopping the flocculation and sedimentation apparatus, and sedimentation and concentration of the sludge is excessively promoted. This may cause the clogging of the sludge drawing line or an abnormal torque in the scraping device. In addition, arranging the sludge blanket and the sludge concentration portion one on another may increase the height of the flocculation and sedimentation apparatus, leading to difficulty in installing the apparatus indoors. In contrast, sludge blanket 51 is not present above sludge concentration tank 103 in the present embodiment, and sedimentation and concentration of the sludge are not excessively promoted when flocculation and sedimentation apparatus 100 is stopped. The height of flocculation and sedimentation apparatus 100 is determined by the height of sedimentation tank 102 and the height of a part of sludge concentration tank 103 that protrudes from sedimentation tank 102. Thus, it is easy to limit the height of flocculation and sedimentation apparatus 100. In addition, sedimentation tank 102 is physically separated from sludge concentration tank 103 by the wall. Therefore, the sludge blanket 151 in sedimentation tank 102 is less affected when the concentrated sludge is drawn out from sludge concentration tank 103, and the water quality of treated water is less likely to deteriorate.

If sedimentation tank 102 and sludge concentration tank 103 are laterally arranged adjacent to each other (not concentrically arranged), then a drive for agitating blades and a sludge scraping device in the sludge concentration tank is required in addition to a drive for raw water supply mechanism 110. Due to the concentric arrangement of sedimentation tank 102 and sludge concentration tank 103, an increase in apparatus cost can be limited because first agitating blades 126 of sludge concentration tank 103 can be driven by rotating shaft 111 of raw water supply mechanism 110. In addition, the height of the sludge blanket varies between a portion of sedimentation tank 102 adjacent to sludge concentration tank 103 and a portion of sedimentation tank 102 away from sludge concentration tank 103. Due to this, a uniform flow of raw water in sedimentation tank 102 is prevented, the sludge blanket is disturbed and the water quality of treated water deteriorates. In the present embodiment, sedimentation tank 102 is provided around sludge concentration tank 103. The flocs uniformly overflow into sludge concentration tank 103 along the entire circumference of sedimentation tank 102, and the height of sludge blanket 51 in sedimentation tank 102 is kept uniform.

When comparing the width of sludge concentration tank 103 located inside sedimentation tank 102 to the width of sludge concentration tank 103 located outside sedimentation tank 102 on condition that the total area of sedimentation tank 102 and sludge concentration tank 103 is the same, sludge concentration tank 103 located outside sedimentation tank 102 is narrower and more likely to cause clogging by the sludge. It is difficult to install agitating blades to prevent clogging in narrow sludge concentration tank 103. To solve this problem, sludge concentration tank 103 needs to be widened, but this increases the installation area. It is thus preferable to arrange sludge concentration tank 103 inside sedimentation tank 102.

In the present embodiment, the bottom of sludge concentration tank 103 located inside sedimentation tank 102 is lower than the bottom of sedimentation tank 102, but a configuration may be possible in which sedimentation tank 102 is located inside sludge concentration tank 103 and the bottom of sedimentation tank 102 is lower than the bottom of sludge concentration tank 103. In other words, this modification has a first tank, which is either a sedimentation tank that causes flocs in raw water to be sedimented and separated or a sludge concentration tank that collects and concentrates the flocs by allowing the flocs to overflow from the sedimentation tank; a second tank, which is the remaining sedimentation tank or the sludge concentration tank, wherein the second tank is surrounded by the first tank; a first drawing nozzle that is provided at a side surface of the first tank and that draws out sludge that is sedimented on a bottom of the first tank; and a second drawing nozzle that is provided at a side surface of the second tank and that draws out sludge that is sedimented on a bottom of the second tank. The bottom of the second tank is lower than the bottom of the first tank, and the second drawing nozzle is located below the bottom of the first tank. In this case, raw water supply mechanism 110 may be formed, not by the above-mentioned branch structure, but by a pipe that vertically extends along center line CL, as well as a plurality of supply pipes that branch from the pipe.

Second Embodiment

Figure 2:
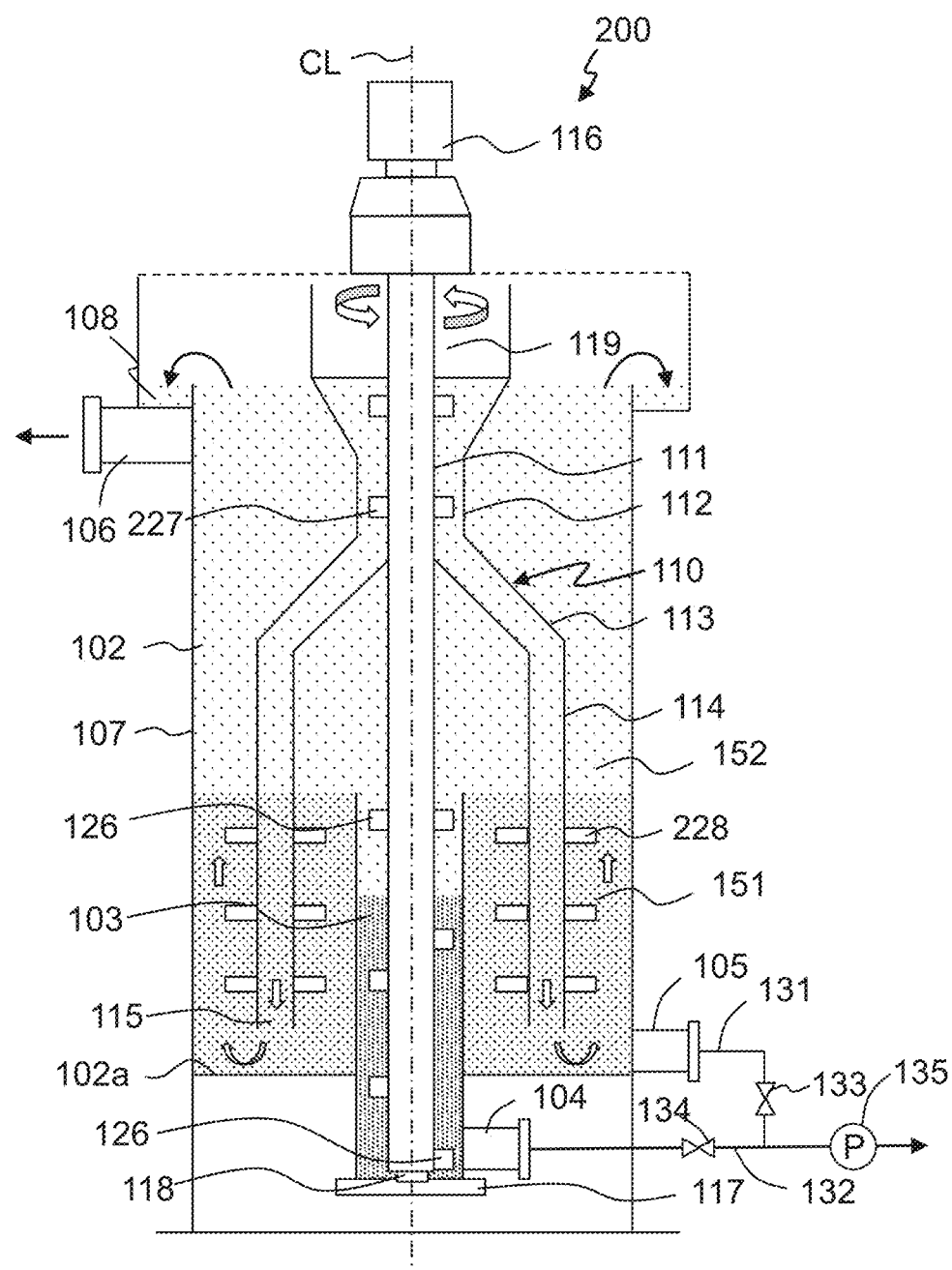
FIG. 2 is a schematic cross-sectional view of a flocculation and sedimentation apparatus according to the second embodiment.
Figure 3:
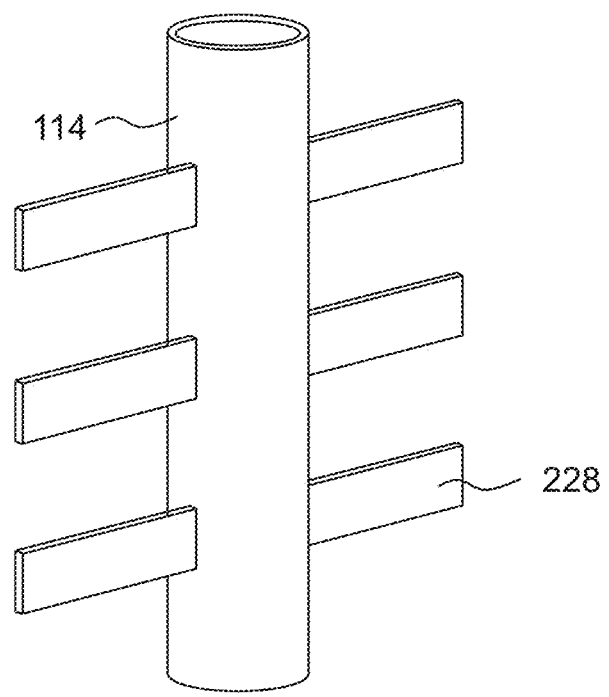
FIG. 3 is a perspective view of a third pipe portion of a raw water supply mechanism that is provided with third agitating blades.

FIG. 2 shows flocculation and sedimentation apparatus 200 according to the second embodiment of the present invention, and FIG. 3 shows the configuration of third agitating blades. Members denoted by the same reference numerals as those in the first embodiment have the same configurations as the corresponding members in the first embodiment. In the present embodiment, if fluorine wastewater is the object for instance, then raw water is introduced to a calcium reaction tank and an inorganic flocculation reaction tank first, where the fluorine wastewater is treated, as described above, but a polymer flocculant reaction tank is not provided. Instead, polymer flocculant is only added to a pipe. Specifically, the agitation of raw water to which a polymer flocculant is added or the flocculation reaction is not performed upstream of flocculation and sedimentation apparatus 200, but the agitation or the flocculation reaction is performed by means of second and third agitating blades 227 and 228 that are provided in raw water supply mechanism 110. The breakage of flocs during transfer is thus minimized.

Second agitating blades 227 for agitating raw water are provided at a portion of the circumferential surface of rotating shaft 111 that is enveloped by first pipe portion 112. A plurality of second agitating blades 227 is arranged in the height direction of rotating shaft 111. Second agitating blades 227 agitate raw water and uniformly distribute unreacted polymer flocculant into the raw water. Second agitating blades 227 are flat plates that are inclined relative to a vertical plane, but can also be constructed like first agitating blades 126. Second agitating blades 227 are provided in raw water supply mechanism 110. Therefore, there is no need to provide a separate power source and a separate power transmission.

Third agitating blades 228 that agitate raw water are provided on the outer surfaces of third pipe portions 114 of raw water supply mechanism 110. Each third agitating blade 228 has the shape of a flat plate, and a plurality of third agitating blades 228 is arranged at an interval of 180 degrees in the vertical direction. Third agitating blades 228 agitate unreacted polymer flocculant in the raw water, uniformly distribute the unreacted polymer flocculant into sedimentation tank 102 and thereby form flocs. By agitating sedimentation tank 102 by means of third agitating blades 228, collision between third agitating blade 228 and the flocs and collision between the flocs occur, and the flocs are mechanically dehydrated. In this way, flocs having larger density and sedimentation velocity are formed.

In addition, unreacted polymer flocculant causes re-flocculation of the fine flocs in sludge blanket 151, strengthens sludge blanket 151 and enhances the water quality of treated water. Since third agitating blades 228 are provided in raw water supply mechanism 110, there is no need to provide a separate power source and a separate power transmission.

When agitation of raw water to which polymer flocculant added or a flocculation reaction is performed in sedimentation tank 102, as in the present embodiment, high density flocs are less likely to be generated and light flocs are mainly present at the central portion of sedimentation tank 102. This is because circumferential velocity caused by agitation is lower (substantially close to zero) at the center of sedimentation tank 102 than on the outer side of sedimentation tank 102. Accordingly, if sludge concentration tank 103 is arranged outside sedimentation tank 102, then light flocs formed at the central portion of sedimentation tank 102 flow into the treated water, and clear treated water cannot be obtained. However, if sludge concentration tank 103 is arranged at the center of sedimentation tank 102, high circumferential velocity can be obtained even at a portion close to the central axis. In addition, if sludge is circulated in order to return the concentrated sludge to the upstream side, suction flow toward sludge concentration tank 103 provided at the center of sedimentation tank 102 is generated. Accordingly, even if light flocs are formed at the central portion of sedimentation tank 102, the light flocs are easily sucked into sludge concentration tank 103. Thus, the light flocs do not flow into treated water, and clear treated water can be obtained.

Third Embodiment

Figure 4:
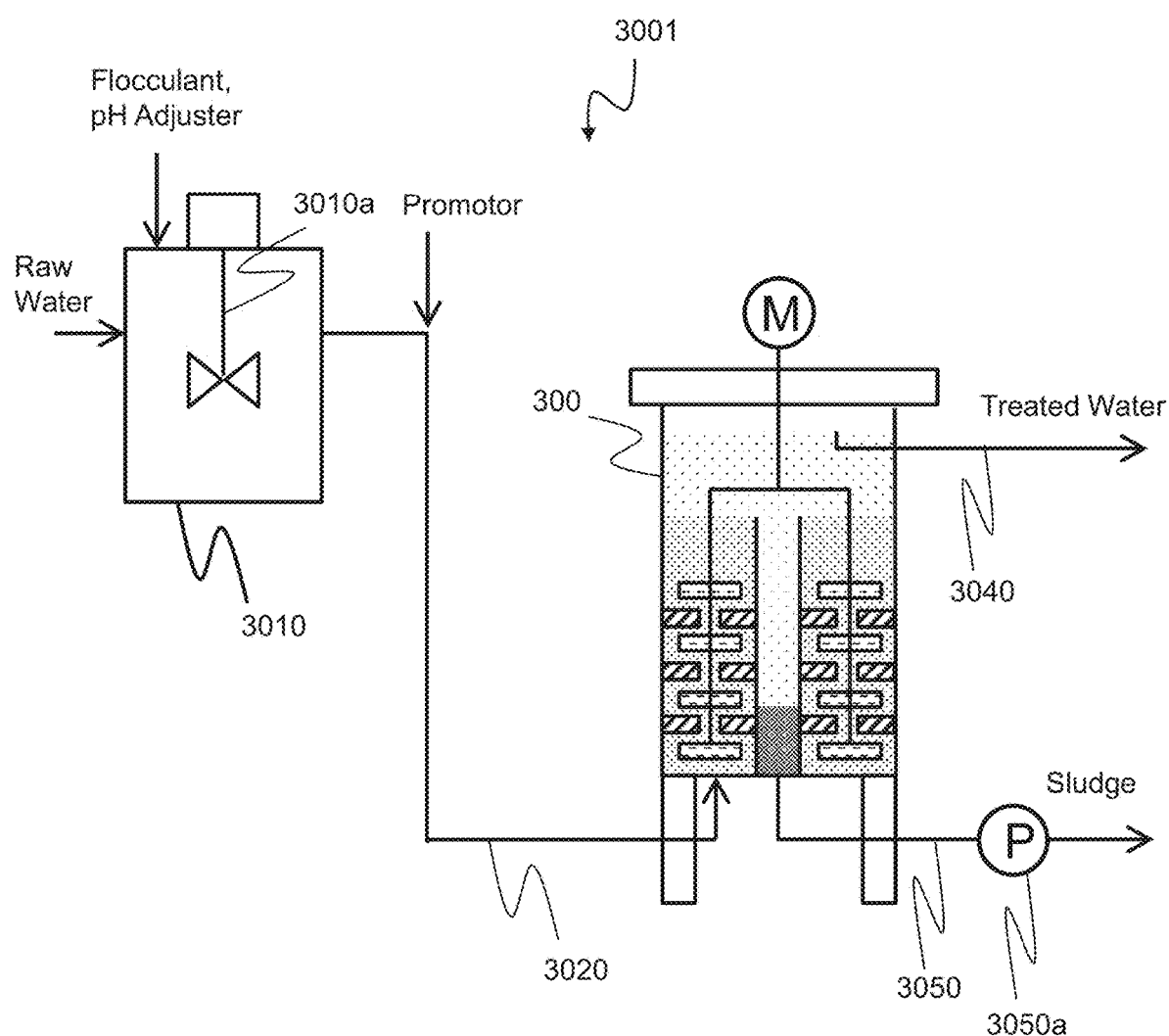
FIG. 4 is a schematic view schematically illustrating a contaminant treatment system according to the third embodiment.

FIG. 4 is a schematic view of contaminant treatment system 3011 having flocculation and sedimentation apparatus 300 according to the third embodiment of the present invention. Contaminant treatment system 3001 shown in FIG. 4 has reaction tank 3010, connecting pipe 3020 and flocculation and sedimentation apparatus 300.

Reaction tank 3010 is a vessel that contains raw water that includes turbidity components, such as suspended matters. Flocculant for flocculating the turbidity components in the raw water to form flocs and a pH adjuster for adjusting the pH of the raw water are added to the raw water that is contained in reaction tank 3010. In the present embodiment, the raw water is kaolin simulated wastewater, which is generated by causing kaolin to be suspended in filtrate water, which is generated by filtering groundwater. As the flocculant, PAC (polyaluminum chloride), which is an inorganic flocculant, and a cationic polymer, which is a polymer flocculant, are used. The pH adjuster is caustic soda (sodium hydroxide).

Reaction tank 3010 has agitator 3010a for agitating raw water contained therein. Agitator 3010a rapidly agitates the raw water to which the flocculant is added, flocculates the turbidity components in the raw water, and thereby forms flocs. The flocs formed in reaction tank 3010 are small fibrous flocs.

Connecting pipe 3020 connects reaction tank 3010 to flocculation and sedimentation apparatus 300, and supplies the raw water from reaction tank 3010 to flocculation and sedimentation apparatus 300. A promotor for promoting the formation of flocs is added to the raw water when the raw water flows through connecting pipe 3020. The promotor is an anionic polymer in the present embodiment. The size of the flocs can be increased by adding the promotor to the raw water.

Flocculation and sedimentation apparatus 300 slowly agitates the raw water that is supplied from reaction tank 3010 via connecting pipe 3020, makes the flocs grow, causes collision between the flocs or rolling motion of the flocs, and thereby forms spherical pellets. Flocculation and sedimentation apparatus 300 separates the raw water into sludge and treated water by sedimenting the agglomerated material thus formed. More specifically, flocculation and sedimentation apparatus 300 causes collisions between flocs and makes the flocs grow by agitating the raw water, concentrates the flocs into spherical pellets by causing mechanical dehydrating action or rolling motion due to the agitation, and generates sedimented pellets. Drawing pipe 3040 for drawing out the separated treated water and sludge drawing pipe 3050 for drawing out the separated sludge are connected to flocculation and sedimentation apparatus 300. Pump 3050a for drawing out sludge is provided on sludge drawing pipe 3050.

Figure 5:
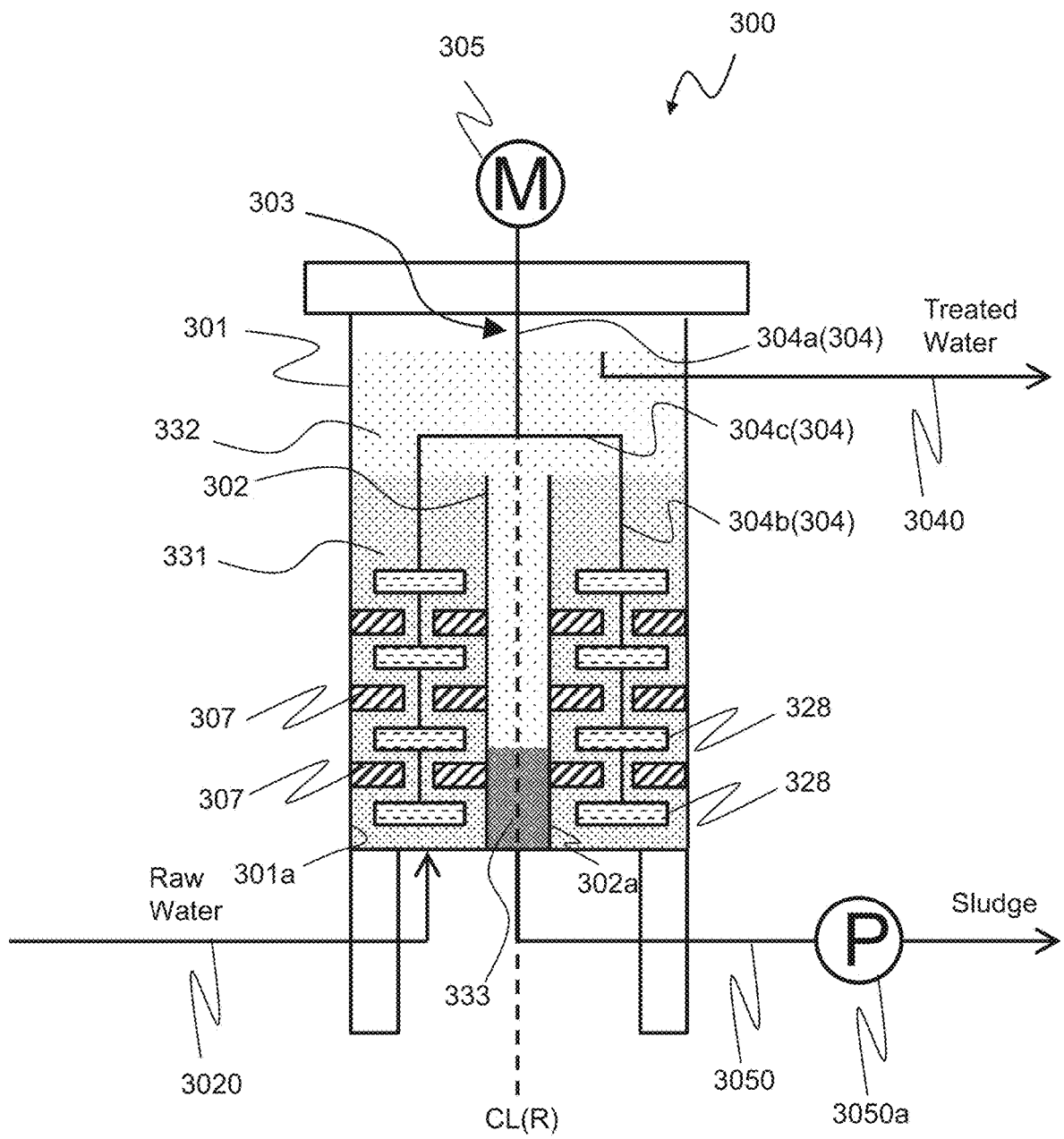
FIG. 5 is a cross-sectional view schematically illustrating the flocculation and sedimentation apparatus according to the third embodiment.

Flocculation and sedimentation apparatus 300 will be described below in more detail. FIG. 5 is a cross-sectional view schematically illustrating flocculation and sedimentation apparatus 300, and FIG. 6 is a perspective view showing a part (a lower portion) of flocculation and sedimentation apparatus 300.

Figure 6:
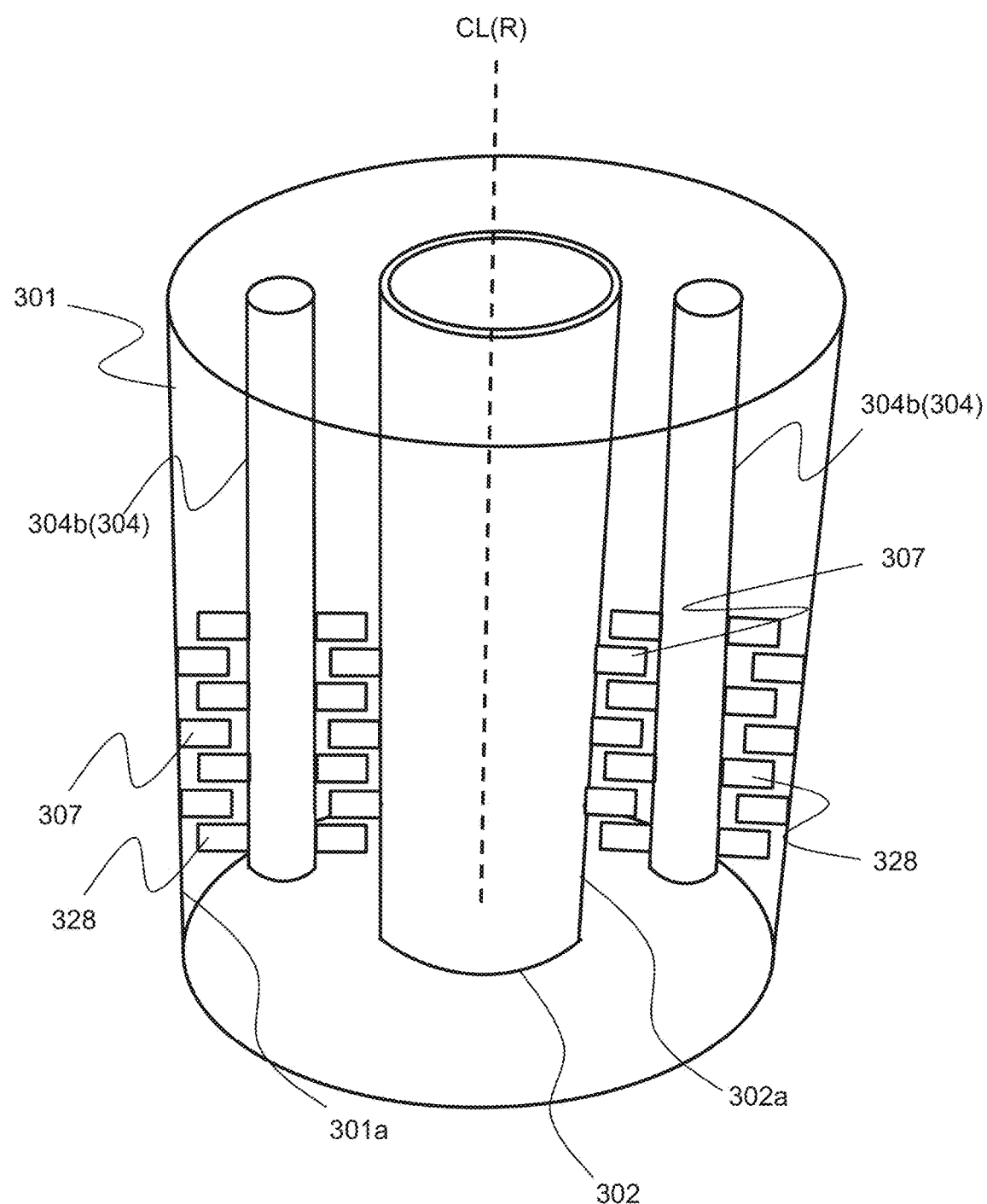
FIG. 6 is a partial perspective view showing the flocculation and sedimentation apparatus according to the third embodiment.

As shown in FIGS. 5 and 6, flocculation and sedimentation apparatus 300 has sedimentation tank 301 that contains raw water that is supplied from reaction tank 3010 via connecting pipe 3020 and that separates flocs from the raw water by sedimenting the flocs, sludge concentration tank 302 that is surrounded by sedimentation tank 301 and that collects and concentrates the flocs, and agitating mechanism 303 that agitates the raw water.

Sedimentation tank 301 and sludge concentration tank 302 have cylindrical shapes in the example illustrated, but the shape is not limited to a cylindrical shape. For example, sedimentation tank 301 and sludge concentration tank 302 may have a prism shape or the like. Alternatively, sedimentation tank 301 and sludge concentration tank 302 may have shapes different from each other.

Sedimentation tank 301 and sludge concentration tank 302 have a vertical common center line CL in the example illustrated, but center lines CL may be shifted from each other. The top of sludge concentration tank 302 is set to be lower than the top of sedimentation tank 301 in order to allow the flocs to flow into sludge concentration tank 302 from sedimentation tank 301. Drawing pipe 3040 is provided at the upper portion of sedimentation tank 301, and sludge drawing pipe 3050 is provided at the lower portion (more specifically, the bottom) of sludge concentration tank 302.

Agitating mechanism 303 has rotatable member 304 that rotates in sedimentation tank 301, motor 305 that is connected to rotatable member 304 and that functions as a power source for rotating rotatable member 304, and third agitating blades 328 that are attached to rotatable member 304.

Rotatable member 304 rotates around sludge concentration tank 302 about central axis R that extends in sludge concentration tank 302 generally in parallel to center line CL of sludge concentration tank 302. In the present embodiment, center line CL of sludge concentration tank 302 coincides with central axis R of rotatable member 304.

Rotatable member 304 has support portion 304a that is concentric with center line CL (central axis R) of sludge concentration tank 302, agitating portions 304b that extend generally in parallel to central axis R along the side wall of sludge concentration tank 302 (between inner wall surface 301a of sedimentation tank 301 and outer wall surface 302a of sludge concentration tank 302), and connection portion 304c that connects support portion 304a to agitating portions 304b. Support portion 304a is arranged above sludge concentration tank 302 in the present embodiment. Motor 305 is connected to the upper end of support portion 304a. With the rotation of support portion 304a by motor 305, agitating portions 304b rotate around sludge concentration tank 302 (between inner wall surface 301a of sedimentation tank 301 and outer wall surface 302a of sludge concentration tank 302). The number of agitating portions 304b may be one or may be two or more. In the example illustrated, two agitating portions 304b are provided, opposite to each other with sludge concentration tank 302 interposed therebetween.

Third agitating blades 328 are attached to agitating portions 304b of rotatable member 304. A plurality of third agitating blades 328 is attached to each of two agitating portions 304b. In the present embodiment, four third agitating blades 328 are provided in each agitating portion 304b, and four third agitating blades 328 of each agitating portion 304b are arranged at a constant interval in the vertical direction.

Flocculation and sedimentation apparatus 300 further includes fixed blades 307. Fixed blades 307 are attached to at least one wall surface from among inner wall surface 301a of sedimentation tank 301 and outer wall surface 302a of sludge concentration tank 302. Out of inner wall surface 301a of sedimentation tank 301 and outer wall surface 302a of sludge concentration tank 302, fixed blades 307 are preferably attached to outer wall surface 302a of sludge concentration tank 302, where the circumferential velocity of third agitating blades 328 is relatively low. More preferably, fixed blades 307 are attached to inner wall surface 301a of sedimentation tank 301 and outer wall surface 302a of sludge concentration tank 302. In the example illustrated, a plurality of fixed blades 307 is attached to inner wall surface 301a of sedimentation tank 301 and to outer wall surface 302a of sludge concentration tank 302. Third agitating blades 328 and fixed blades 307 are preferably arranged in alternation in the vertical direction. In the present embodiment, each fixed blade 307 is arranged between third agitating blades 328. Due to this configuration, third agitating blades 328 and fixed blades 307 pass each other when third agitating blades 328 rotate.

In contaminant treatment system 3001 thus constructed, flocculant and pH adjuster are added to raw water that is introduced to reaction tank 3010. The raw water to which the flocculant and the pH adjuster have been added is rapidly agitated by agitator 3010a in reaction tank 3010 and fibrous flocs are formed. The raw water that contains the flocs is supplied to sedimentation tank 301 of flocculation and sedimentation apparatus 300 from below via connecting pipe 3020. At that time, the promotor is added to the raw water that flows through connecting pipe 3020.

The raw water that is supplied to sedimentation tank 301 of flocculation and sedimentation apparatus 300 is slowly agitated by agitating mechanism 303. Collision and rolling motion of the flocs are repeatedly caused by the agitation, the floc particle size gradually increases and spherical pellets are formed. The pellets form a fluid bed, i.e., pellet blanket 331 in the lower portion of sedimentation tank 301 due to the weights thereof and an upward flow of the raw water that is supplied to sedimentation tank 301 from below. Thus, treated water layer 332, in which turbidity components are drawn out from the raw water in the form of pellets, is formed in the upper portion of sedimentation tank 301.

The top (the boundary between pellet blanket 331 and treated water layer 332) of pellet blanket 331 rises gradually. As shown in FIG. 5, when the top of pellet blanket 331 reaches the top of outer wall surface 302a of sludge concentration tank 302, the pellets overflow from outer wall surface 302a of sludge concentration tank 302 and are collected in sludge concentration tank 302. The pellets are concentrated in the lower portion of sludge concentration tank 302 and become sludge 333. The treated water in sedimentation tank 301 is drawn out via drawing pipe 3040, and the sludge is drawn out via sludge drawing pipe 3050.

According to the present embodiment, sedimentation tank 301 separates flocs from raw water. Sludge concentration tank 302 that is surrounded by sedimentation tank 301 collects and concentrates the flocs that are separated by sedimentation tank 301. Agitating portions 304b of rotatable member 304 rotate about central axis R, which extends in sludge concentration tank 302 generally in parallel to center line CL of sludge concentration tank 302, between inner wall surface 301a of sedimentation tank 301 and outer wall surface 302a of sludge concentration tank 302. Third agitating blades 328 that are attached to rotatable member 304 agitate the raw water. Due to sludge concentration tank 302 present between central axis R and third agitating blades 328, third agitating blades 328 are located at a predetermined distance from central axis R. Thus, higher circumferential velocity can be obtained even at a portion of third agitating blade 328 close to central axis R in the present embodiment than a case in which agitating blades are provided on the side surface of a rotatable member that is concentric with the rotating shaft. It is thus possible to improve the fluidity near the rotating shaft and to prevent the adhesion of the flocs.

In the present embodiment, fixed blades 307 are attached to at least one wall surface from among inner wall surface 301a of sedimentation tank 301 and outer wall surface 302a of sludge concentration tank 302. Accordingly, the flocs that adhere to third agitating blades 328 can be cut off by fixed blades 307. In addition, the fluidity near agitating blades 307 can be further improved by third agitating blades 328 and fixed blades 307 passing each other. It is thus possible to prevent sludge from being formed across third agitating blades 328.

Example

Figure 7:
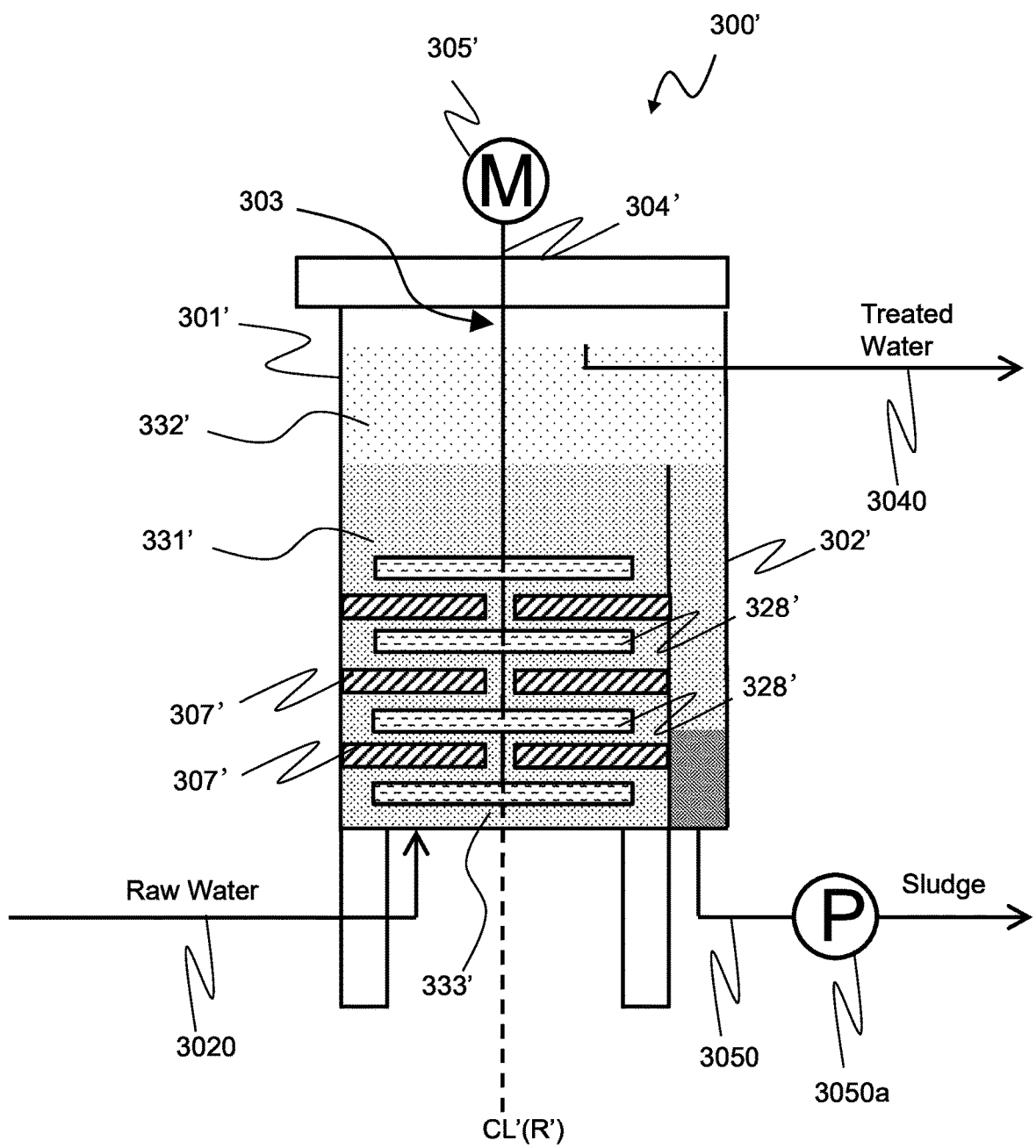
FIG. 7 is a schematic view showing a flocculation and sedimentation apparatus according to the comparative example.

FIG. 7 is a cross-sectional view schematically illustrating a flocculation and sedimentation apparatus according to a reference example. In flocculation and sedimentation apparatus 300' shown in FIG. 7, a prime (') is added to components corresponding to the components of flocculation and sedimentation apparatus 300 according to the third embodiment shown in FIG. 5. Flocculation and sedimentation apparatus 300' is different from flocculation and sedimentation apparatus 300 according to the third embodiment in that sludge concentration tank 302' is provided outside the side wall of sedimentation tank 301'. and in that rotatable member 304' is provided concentric with central axis R'. Accordingly, the circumferential velocity of third agitating blade 328' that is attached to rotatable member 304' is close to zero near rotatable member 304'.

In the following example, flocculation and sedimentation apparatus 300 according to the third embodiment shown in FIG. 5 is compared to flocculation and sedimentation apparatus 300' according to the reference example shown in FIG. 7. Reaction tank 3010 and connecting pipe 3020 are the same both in flocculation and sedimentation apparatus 300 and in flocculation and sedimentation apparatus 300'. Reaction tank 3010 has a capacity of 201 L. Sedimentation tanks 301 and 301' have a diameter of 230 mm and a capacity of 35 L. Pellet blankets 331 and 331' have a height of 55 cm.

Raw water is kaolin simulated wastewater that includes suspended solids (SS) at a rate of 300 mg/L. PAC is added to the raw water as inorganic flocculant at a rate of 150 mg/L, cationic polymer is added to the raw water as polymer flocculant at a rate of 1.5 mg/L of, and anionic polymer is added to the raw water as promotor at a rate of 3.0 mg/L. The flow rate of the raw water is 830 L/h (linear velocity LV: 20 m/h).

A test of continuously feeding water for ten hours was conducted on flocculation and sedimentation apparatus 300 according to the third embodiment and on flocculation and sedimentation apparatus 300' according to the reference example on the above-mentioned conditions. After that, sludge lumps that adhered to the inside of sedimentation tanks 301 and 301' were observed. After the water supply was stopped and the boundary of the blanket was lowered to a position where the agitating blades were exposed, observation was conducted as to whether or not the sludge adhered. Table 1 shows the result of the observation.

TABLE 1

|  | Presence of sludge lump | Where sludge lump adhered | Size and shape of sludge lump |
|---|---|---|---|
| Embodiment | No | N/A | N/A |
| Reference example | Yes | from the rotatable member to a part of the agitating blades near the rotatable member | cylindrical shape having a diameter of about 100 mm and a height of 50 mm |

As shown in Table 1, sludge lumps were not found in flocculation and sedimentation apparatus 300 according to the third embodiment. In flocculation and sedimentation apparatus 300' according to the comparative example, the presence of sludge lumps was found from the rotatable member to a portion of the agitating blades near the rotatable member, although the formation of sludge lumps across adjacent agitating blades was prevented due to the fixed blades. Thus, it was demonstrated that flocculation and sedimentation apparatus 300 according to the third embodiment has the effect of preventing the adhesion of flocs.

Fourth Embodiment

Figure 8:
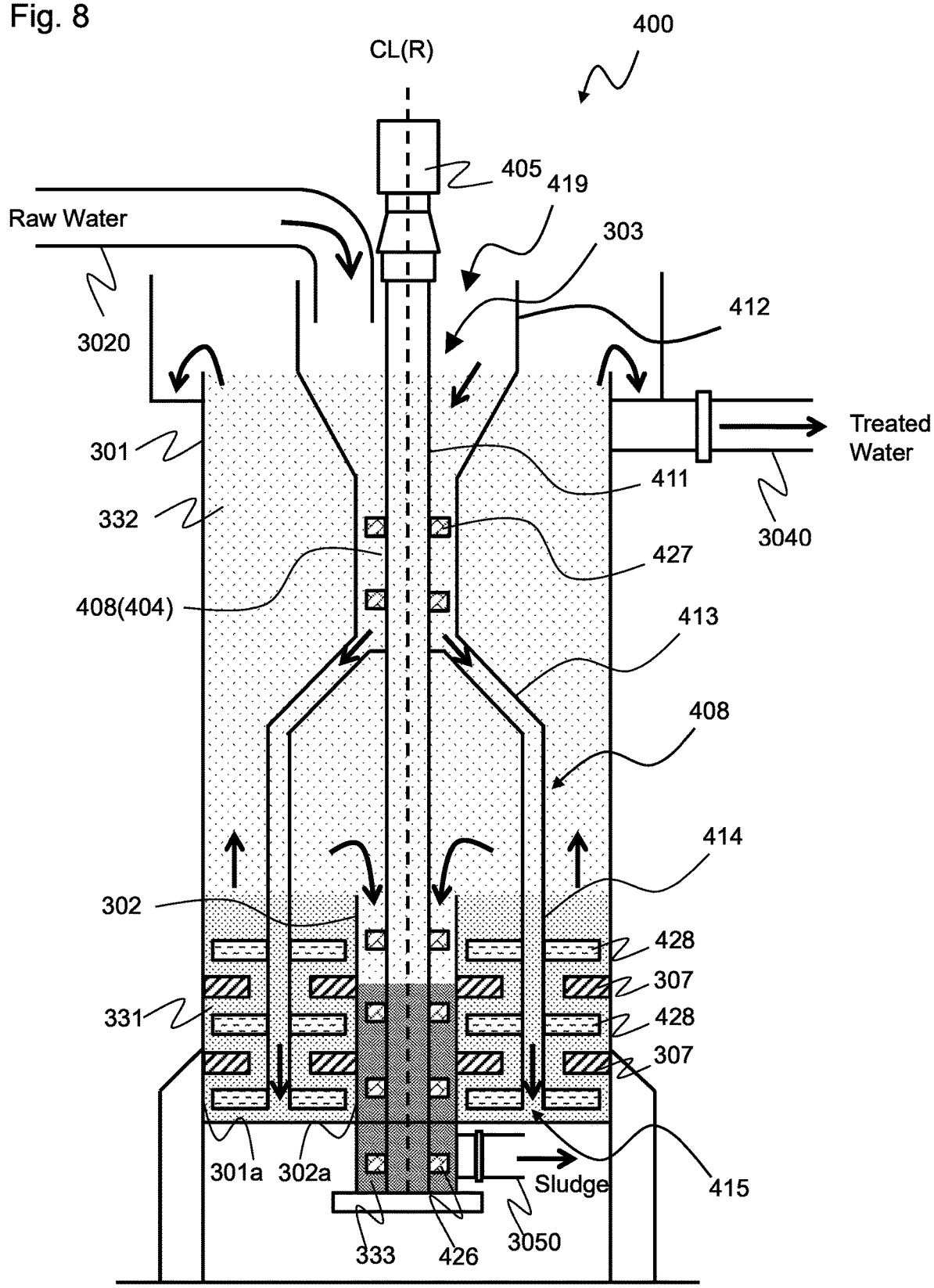
FIG. 8 is a schematic view schematically illustrating a flocculation and sedimentation apparatus according to the fourth embodiment.

FIG. 8 is a schematic view schematically illustrating a flocculation and sedimentation apparatus according to the fourth embodiment of the present invention. Flocculation and sedimentation apparatus 400 according to the present embodiment shown in FIG. 7 is different from flocculation and sedimentation apparatus 300 according to the third embodiment shown in FIG. 5 in that rotatable member 404 has raw water supply mechanism 408 that discharges the raw water toward the lower portion of sedimentation tank 301. Members denoted by the same reference numerals as those in the third embodiment have the same configurations as the corresponding members in the third embodiment.

Raw water supply mechanism 408 rotates about central axis R, which extends in sludge concentration tank 302 generally in parallel to center line CL of sludge concentration tank 302, around sludge concentration tank 302 in the same manner as rotatable member 304 according to the third embodiment. In the present embodiment, center line CL of sludge concentration tank 302 coincides with central axis R of raw water supply mechanism 408.

Raw water supply mechanism 408 has rotating shaft 411 that is concentric with center line CL of sludge concentration tank 302, first pipe portion 412 that surrounds rotating shaft 411 above sludge concentration tank 302, third pipe portion 414 that extends generally in parallel to central axis R along the side wall of sludge concentration tank 302, and second pipe portion 413 that connects first pipe portion 412 to third pipe portion 414. First to third pipe portions 412-414 are connected to rotating shaft 411. Rotating shaft 411 has a cylindrical shape and extends from the bottom of sludge concentration tank 302 to above the top of sludge concentration tank 302. Motor 405 is connected to the upper end of rotating shaft 411. With the rotation of rotating shaft 411 by motor 405, third pipe portion 414 rotates around sludge concentration tank 302. The number of third pipe portions 414 may be one or may be two or more. In the example illustrated, two third pipe portions 414 are provided, and two third pipe portions 414 are provided opposite to each other with sludge concentration tank 302 interposed therebetween.

Raw water introducing portion 419 that is open upwards is provided in the upper portion of first pipe portion 412. Raw water is introduced to raw water introducing portion 419. Raw water supply ports 415 that are open downwards are provided in the lower portions of both third pipe portions 414 (second pipe portions 413). Raw water that is introduced to raw water introducing portion 419 is supplied to sedimentation tank 301 from raw water supply ports 415. First to third pipe portions 412-414 constitute piping that connects raw water introducing portion 419 to raw water supply ports 415.

First agitating blades 426 are provided on the side surface of rotating shaft 411 in sludge concentration tank 302. A plurality of first agitating blades 426 is arranged in the vertical direction. First agitating blades 426 agitate sludge that is deposited in sludge concentration tank 302 and prevents firm adhesion of the sludge. Second agitating blades 427 are provided on the side surface of a portion of rotating shaft 411 that is enveloped by first pipe portion 412. A plurality of second agitating blades 427 is arranged in the vertical direction. Second agitating blades 427 agitate the raw water and uniformly distribute unreacted flocculant into the raw water. Third agitating blades 428 are provided on third pipe portions 414. In the present embodiment, three third agitating blades 428 are provided on each third pipe portion 414, and three third agitating blades 428 on each third pipe portion 414 are vertically arranged at a constant interval. Fixed blades 307 are vertically arranged between third agitating blades 428. Due to this configuration, when third agitating blades 428 rotate, third agitating blades 428 and fixed blades 307 pass each other.

In the present embodiment as well, due to sludge concentration tank 302 that is present between central axis R and third agitating blades 328, third agitating blades 428 are located at a predetermined distance from central axis R. Thus, higher circumferential velocity can be obtained even at a portion of third agitating blade 428 close to central axis R in the present embodiment than a case in which agitating blades are provided on the side surface of a rotatable member that is concentric with the rotating shaft. It is thus possible to prevent the adhesion of the flocs. In addition, rotatable member 304 also functions as raw water supply mechanism 408 in the present embodiment. Therefore, there is no need to separately provide rotatable member 304 in addition to raw water supply mechanism 408. Accordingly, it is possible to simplify the apparatus and to reduce cost.

Fifth Embodiment

Figure 9:
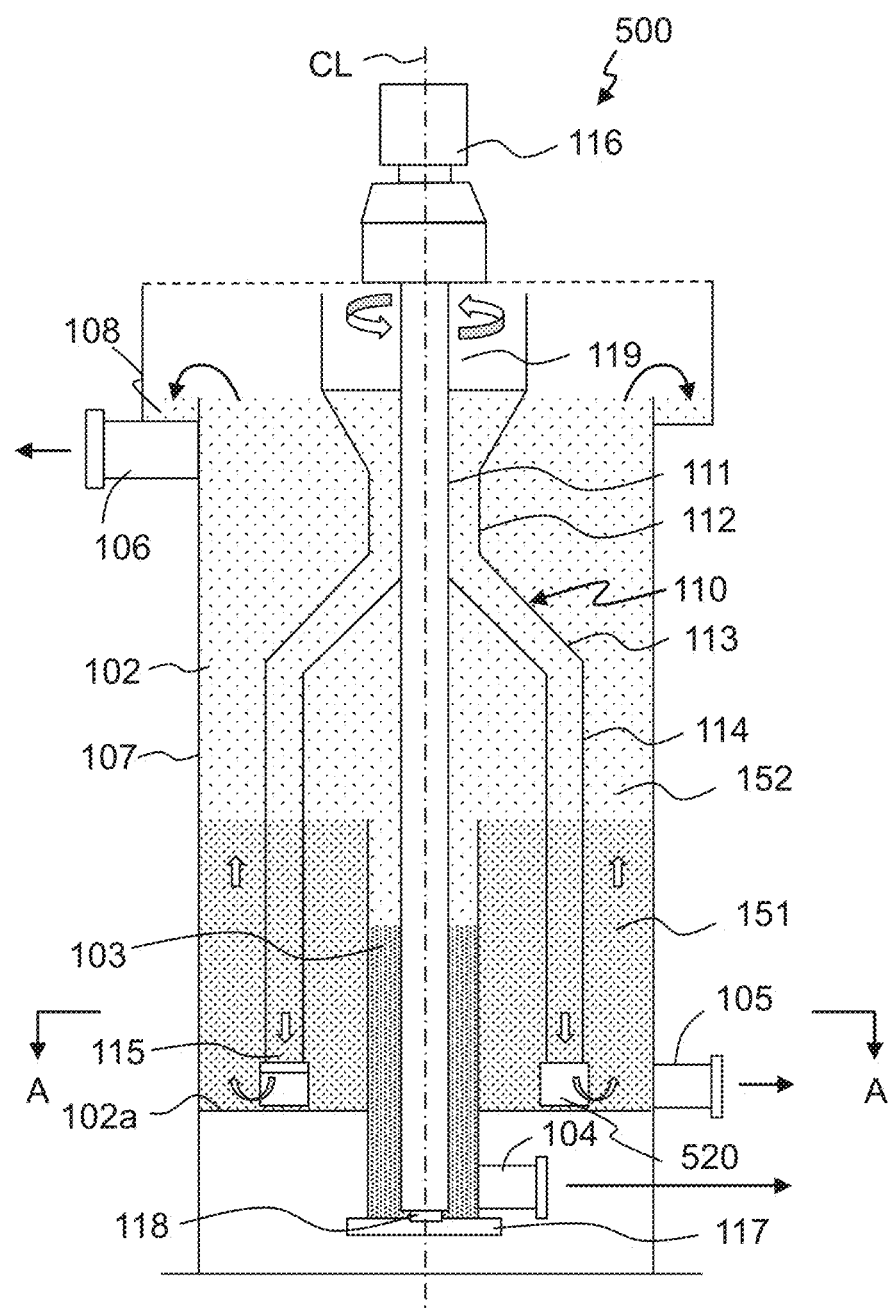
FIG. 9 is a schematic cross-sectional view of a flocculation and sedimentation apparatus according to the fifth embodiment.
Figure 10:
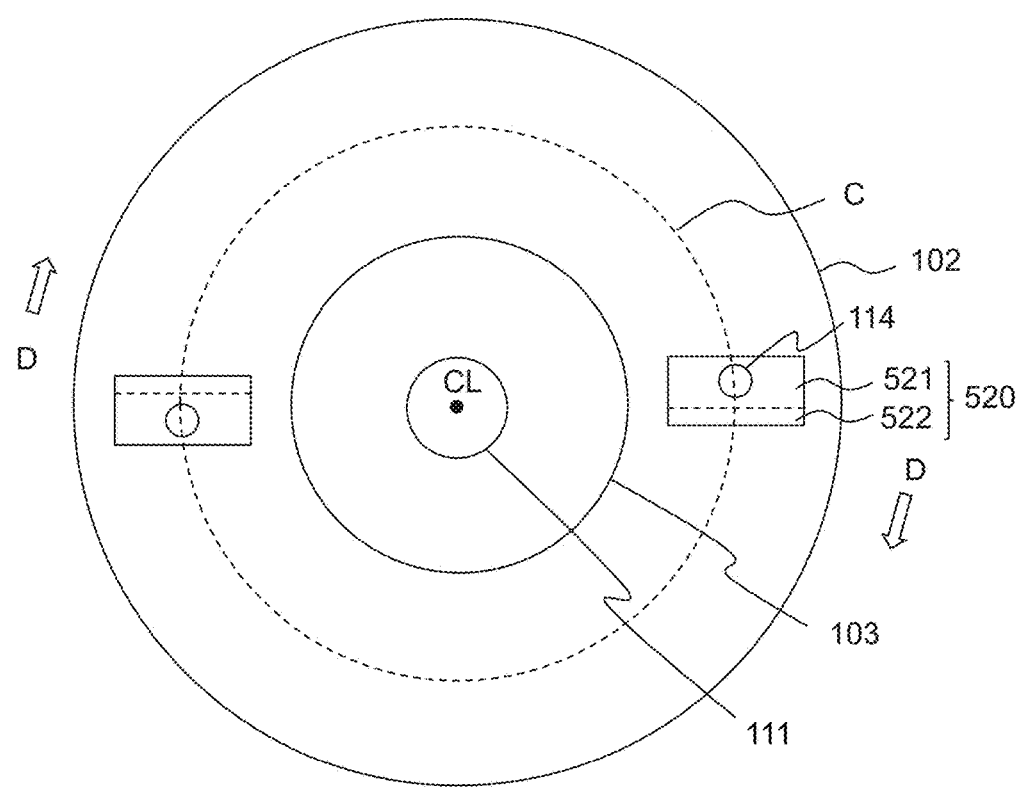
FIG. 10 is a view taken along line A-A in FIG. 9.

FIG. 9 is a schematic cross-sectional view of a flocculation and sedimentation apparatus according to the fifth embodiment, and FIG. 10 is a view, as seen from line A-A in FIG. 9. Flocculation and sedimentation apparatus 500 is the same as flocculation and sedimentation apparatus 100 according to the first embodiment in major configuration and is only different in the configuration near raw water supply port 115. Members denoted by the same reference numerals as those in the first embodiment have the same configurations as the corresponding members in the first embodiment.

When flocculation and sedimentation apparatus 500 is stopped, the flocs in sedimentation tank 102 are sedimented and deposited on bottom 102a of sedimentation tank 102. Raw water supply ports 115 may be covered with the sludge of the flocs. If the sludge firmly adheres to raw water supply ports 115, then raw water supply ports 115 may be clogged, and the function of supplying raw water of raw water supply mechanism 510 may be affected. If the sludge is deposited on moving line C of raw water supply ports 115, the sludge may impair the rotating function of raw water supply mechanism 510. In order to prevent such troubles, raw water supply mechanism 510 has sludge deposition prevention device 520.

Figure 11A:
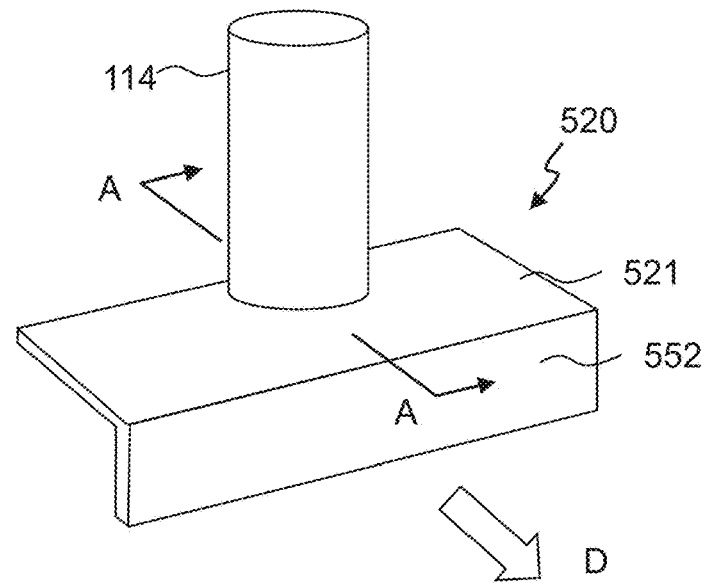
FIG. 11A is a schematic view of a sludge deposition prevention device of the flocculation and sedimentation apparatus shown in FIG. 9.
Figure 11B:
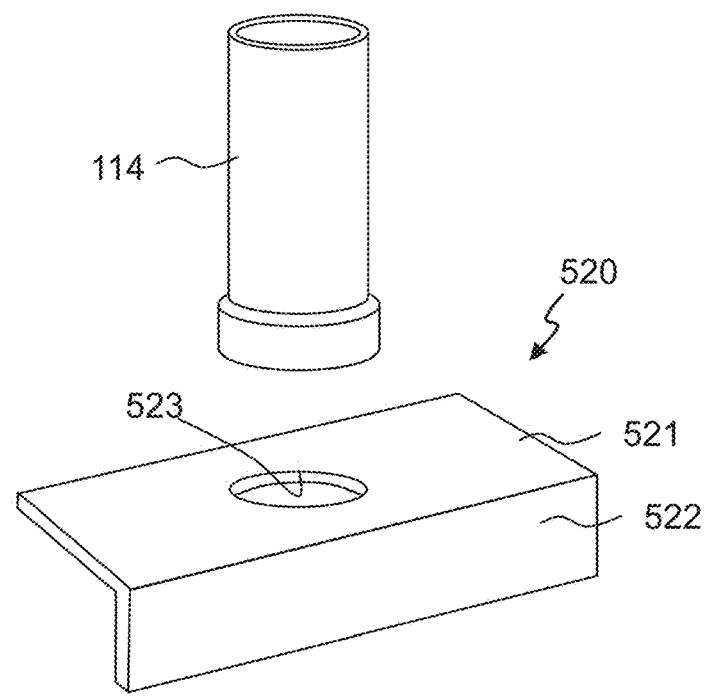
FIG. 11B is a schematic view of the sludge deposition prevention device of the flocculation and sedimentation apparatus shown in FIG. 9.
Figure 11C:
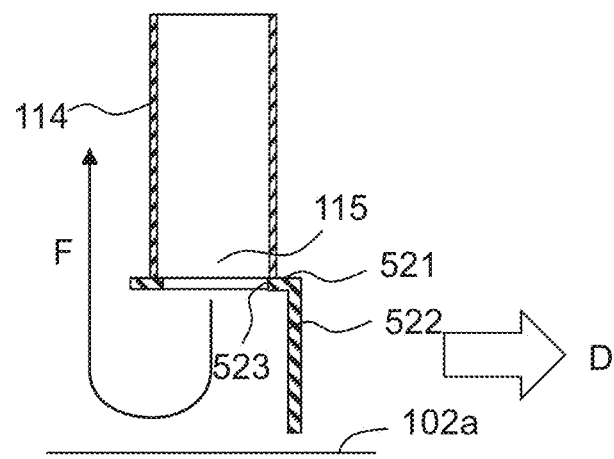
FIG. 11C is a schematic view of the sludge deposition prevention device of the flocculation and sedimentation apparatus shown in FIG. 9.

FIG. 11A shows a perspective view in the vicinity of raw water supply port 115 of raw water supply mechanism 510, FIG. 11B shows an exploded perspective view of first pipe portion 114 and sludge deposition prevention device 520 of raw water supply mechanism 510, and FIG. 11C shows a cross-sectional view taken along line A-A in FIG. 11A. Sludge deposition prevention device 520 consists of second plate member 521 that surrounds raw water supply port 115 and first plate member 522 that is provided on moving line C of raw water supply ports 115 and that extends downward from second plate member 521 at an angle relative to second plate member 521. First plate member 522 is provided ahead of raw water supply port 115 with regard to moving direction D.

Second plate member 521 and first plate member 522 are integral, but second plate member 521 and first plate member 522 may be separate members. Second plate member 521 lies in a horizontal plane, and first plate member 522 lies in a vertical plane, and sludge deposition prevention device 520 has a generally L-shape in side view. Thus, first plate member 522 is orthogonal to second plate member 521. Circular opening 523 that is concentric with raw water supply port 115 of first pipe portion 114 is formed at the center of second plate member 521, and raw water that exits first pipe portion 114 of raw water supply mechanism 510 is supplied to sedimentation tank 102 via opening 523 of second plate member 521. Opening 523 may also be formed at a position that is shifted from the center of second plate member 521.

Second plate member 521 and first plate member 522 are flat plates having generally rectangular shapes, but second plate member 521 and first plate member 522 may be flat plates having square, circular, elliptical or polygonal shapes or may be curved plates.

Second plate member 521 prevents the flocs above second plate member 521 from dropping to below raw water supply port 115. Second plate member 521 covers the space between raw water supply port 115 and bottom 102a of sedimentation tank 102 like an umbrella. Falling flocs are deposited on the upper surface of second plate member 521 when flocculation and sedimentation apparatus 500 is stopped and are less likely to be deposited between raw water supply port 115 and bottom 102a of sedimentation tank 102. First plate member 522, which is provided ahead of raw water supply port 115 with regard to moving direction D of raw water supply ports 115, moves immediately ahead of raw water supply port 115 together with rotation of raw water supply mechanism 510, and continuously scrapes away the sludge deposited between raw water supply port 115 and bottom 102a of sedimentation tank 102.

For that purpose, first plate member 522 preferably extends to the immediate vicinity of bottom 102a of sedimentation tank 102. First plate member 522 can also prevent the deposition of flocs that are diagonally sedimented between raw water supply port 115 and bottom 102a of sedimentation tank 102 when flocculation and sedimentation apparatus 500 is stopped. Due to first pipe portion 114 that extends vertically, the sludge scraped away by first plate member 522 does not enter a space immediately below raw water supply port 115 via a space immediately above raw water supply port 115. In addition, because the gap between raw water supply port 115 and bottom 102a of sedimentation tank 102 is small and is usually filled with sludge, the sludge that was scraped away is unlikely to enter the space immediately below raw water supply port 115 via the gap between raw water supply port 115 and bottom 102a of sedimentation tank 102. Accordingly, the sludge is scraped away from moving line C of raw water supply ports 115. The space immediately below raw water supply port 115 is always kept nearly free of sludge, and raw water is continuously supplied to the space. Therefore, the clogging of raw water supply port 115 is less likely to occur.

As described above, second plate member 521 prevents the sludge from clogging raw water supply port 115 mainly when flocculation and sedimentation apparatus 500 is stopped, while first plate member 522 prevents the sludge from clogging raw water supply port 115 mainly when flocculation and sedimentation apparatus 500 is rotating. When flocculation and sedimentation apparatus 500 restarts, first plate member 522 can also remove the sludge that is deposited on moving line C of raw water supply ports 115 and smoothly rotate raw water supply mechanism 510. Thus, a significant effect can be obtained by combining second plate member 521 to first plate member 522 in the present embodiment, although a limited effect can be obtained by using second plate member 521 or first plate member 522 alone.

Figure 11D:
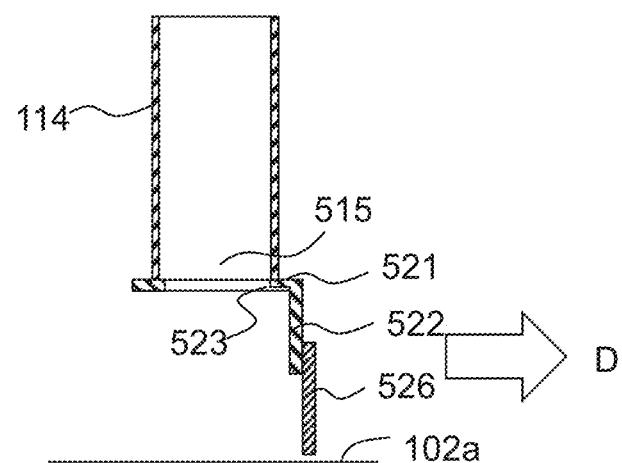
FIG. 11D is a schematic view of the sludge deposition prevention device of the flocculation and sedimentation apparatus shown in FIG. 9.

As shown in FIG. 11D, scraping member 526 that scrapes the sludge that is deposited on bottom 102a of sedimentation tank 102 may be provided at the lower portion of first plate member 522. Scraping member 526 is preferably formed of an elastic member, such as rubber. Scraping member 526 may be in contact with or may be slightly apart from bottom 102a of sedimentation tank 102.

Figure 12:
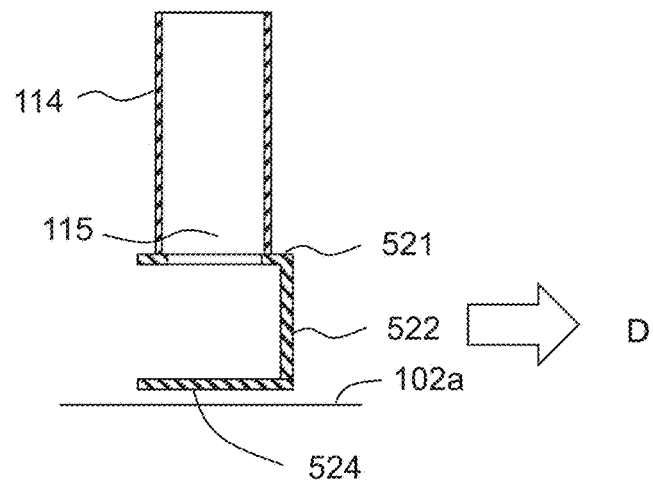
FIG. 12 is a schematic view of the sludge deposition prevention device of the flocculation and sedimentation apparatus according to a modification of the fifth embodiment.

FIG. 12 is a schematic view of sludge deposition prevention device 520 of flocculation and sedimentation apparatus 500 according to a modification of the fifth embodiment of the present invention. Sludge deposition prevention device 520 has third plate member 524 that is connected to the lower end of first plate member 522 and that faces second plate member 521. Third plate member 524 prevents the sludge from penetrating into raw water supply port 115 from below raw water supply port 115. Thus, it is possible to more efficiently prevent the sludge from clogging raw water supply port 115.

Figure 13A:
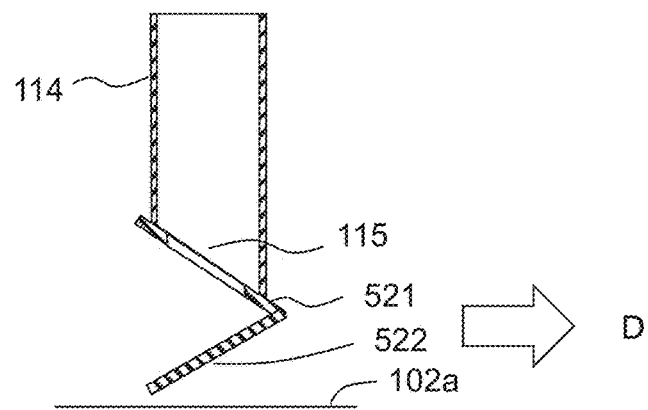
FIG. 13A is a schematic view of the sludge deposition prevention device of the flocculation and sedimentation apparatus according to another modification of the fifth embodiment.
Figure 13B:
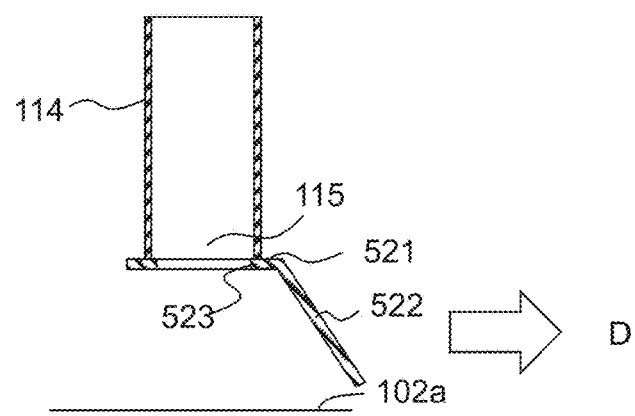
FIG. 13B is a schematic view of the sludge deposition prevention device of the flocculation and sedimentation apparatus according to another modification of the fifth embodiment.

FIG. 13A is a schematic view of sludge deposition prevention device 520 of flocculation and sedimentation apparatus 500 according to another modification of the fifth embodiment of the present invention. Sludge deposition prevention device 520 is rotated relative to the embodiments shown in FIGS. 11A and 11B, as a whole. Second plate member 521 and first plate member 522 are inclined relative to a horizontal plane and relative to a vertical plane in the example illustrated, but at least one plate member from among second plate member 521 and first plate member 522 may be inclined relative to a horizontal plane and relative to a vertical plane. For example, in a modification shown in FIG. 13B, second plate member 521 lies in a horizontal plane, and first plate member 522 extends forward with regard to moving direction D of raw water supply ports 115 and diagonally downward from raw water supply port 115. In the present embodiment as well, second plate member 521 prevents the sludge from clogging raw water supply port 115 mainly when flocculation and sedimentation apparatus 500 is stopped, while first plate member 522 prevents the sludge from clogging raw water supply port 115 mainly when flocculation and sedimentation apparatus 500 is rotating. In addition, raw water can be efficiently distributed in the circumferential direction in the present embodiment because raw water collides against first plate member 522 and then flows diagonally upward.

Figure 14:
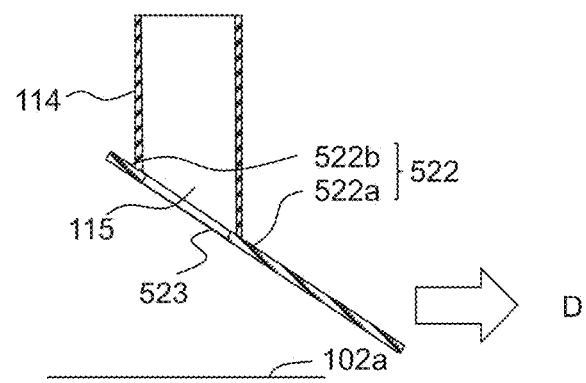
FIG. 14 is a schematic view of the sludge deposition prevention device of the flocculation and sedimentation apparatus according to another modification of the fifth embodiment.

FIG. 14 is a schematic view of sludge deposition prevention device 520 of flocculation and sedimentation apparatus 500 according to another modification of the fifth embodiment of the present invention. First plate member 522 consists of front portion 522a that extends forward with regard to moving direction D of raw water supply port 115 and diagonally downward from raw water supply port 115 and of extension 522b that is integral with front portion 522a and that surrounds raw water supply port 115. Extension 522b has opening 523 for discharging the raw water from raw water supply port 115. Front portion 522a is constructed in the same manner as first plate member 522 shown in FIG. 13B that extends diagonally downward. Front portion 522a prevents the sludge from clogging raw water supply port 115 in the same manner as the embodiment shown in FIG. 13B when flocculation and sedimentation apparatus 500 is rotating. Extension 522b is an alternative structure for second plate member 521, and prevents the sludge from clogging raw water supply port 115 in the same manner as the embodiment shown in FIG. 13B when flocculation and sedimentation apparatus 500 is stopped. First plate member 522, including extension 522b, extends forward with regard to moving direction D and diagonally downward, as a whole.

Figure 15A:
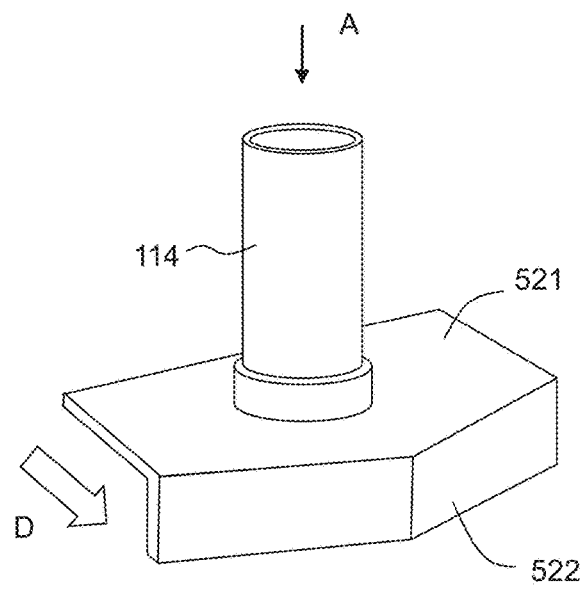
FIG. 15A is a schematic view of the sludge deposition prevention device of the flocculation and sedimentation apparatus according to another modification of the fifth embodiment.
Figure 15B:
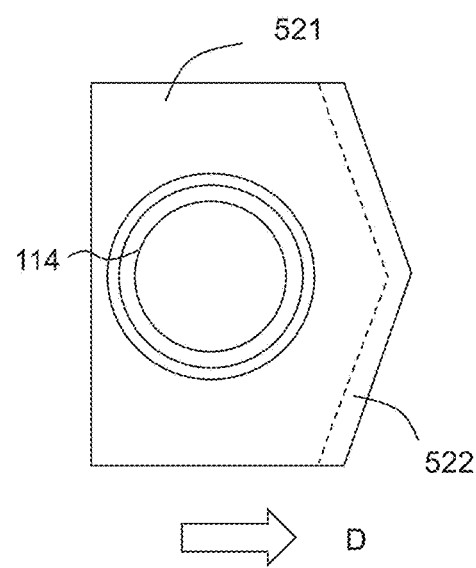
FIG. 15B is a schematic view of the sludge deposition prevention device of the flocculation and sedimentation apparatus according to another modification of the fifth embodiment.

FIGS. 15A and 15B are schematic views of sludge deposition prevention device 520 of flocculation and sedimentation apparatus 500 according to another modification of the fifth embodiment of the present invention. In the present embodiment, the central portion of first plate member 522 with regard to the width direction protrudes farther in moving direction D of raw water supply port 115 than both ends thereof with regard to the width direction. The width direction is a direction orthogonal to moving direction D or moving line C of raw water supply port 115 in a horizontal plane. FIG. 15A shows a perspective view of the vicinity of raw water supply port 115 of raw water supply mechanism 510, and FIG. 15B shows a top view, as viewed from direction A in FIG. 15A. In first plate member 522, the central portion with regard to the width direction protrudes forward with regard to moving direction D, and both ends with regard to the width direction retract rearward with regard to moving direction D of raw water supply ports 115 from the central portion. Accordingly, first plate member 522 has a generally V-shape, as viewed from above, and the sludge that collides against the protruding portion at the central portion moves toward both ends with regard to the width direction along the front surface of first plate member 522 with regard to moving direction D. Due to this configuration, the sludge that is deposited on bottom 102a of sedimentation tank 102 can be more efficiently removed from moving line C of raw water supply ports 115.

First plate member 522 has a generally V-shape in the top view in the above-mentioned configuration, but first plate member 522 may have a curved shape.

Figure 16A:
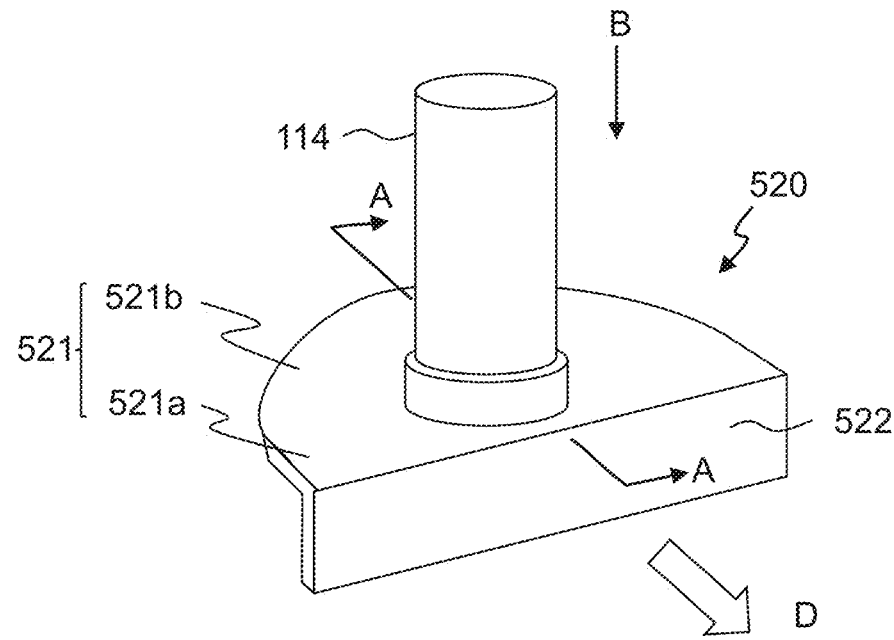
FIG. 16A is a schematic view of the sludge deposition prevention device of the flocculation and sedimentation apparatus according to another modification of the fifth embodiment.
Figure 16B:
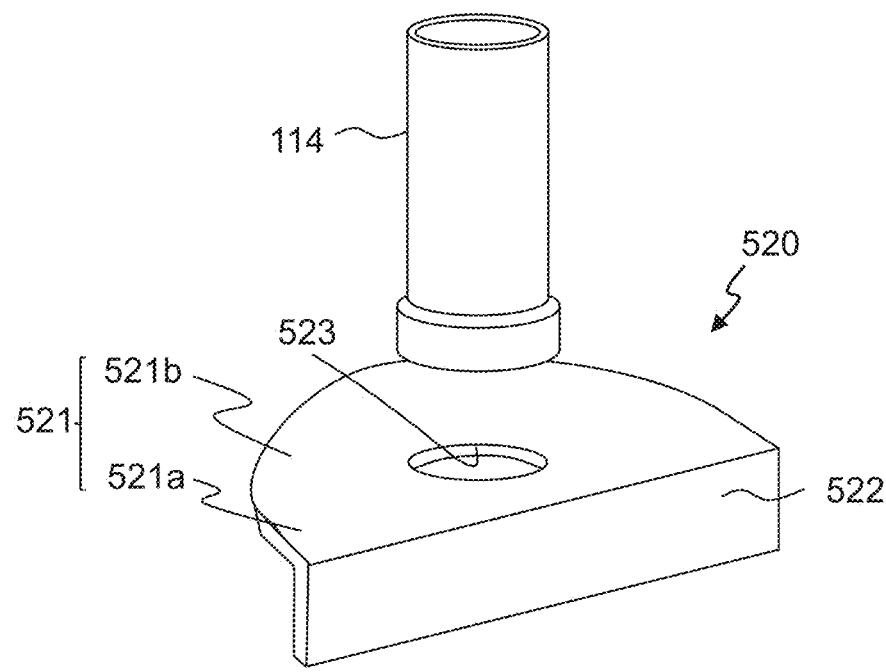
FIG. 16B is a schematic view of the sludge deposition prevention device of the flocculation and sedimentation apparatus according to another modification of the fifth embodiment.
Figure 16C:
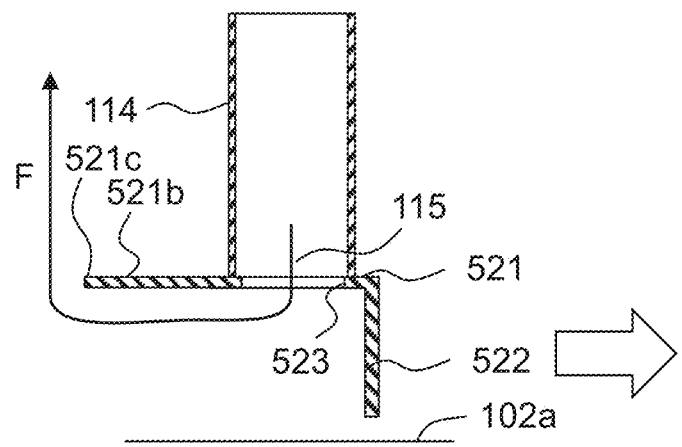
FIG. 16C is a schematic view of the sludge deposition prevention device of the flocculation and sedimentation apparatus according to another modification of the fifth embodiment.
Figure 16D:
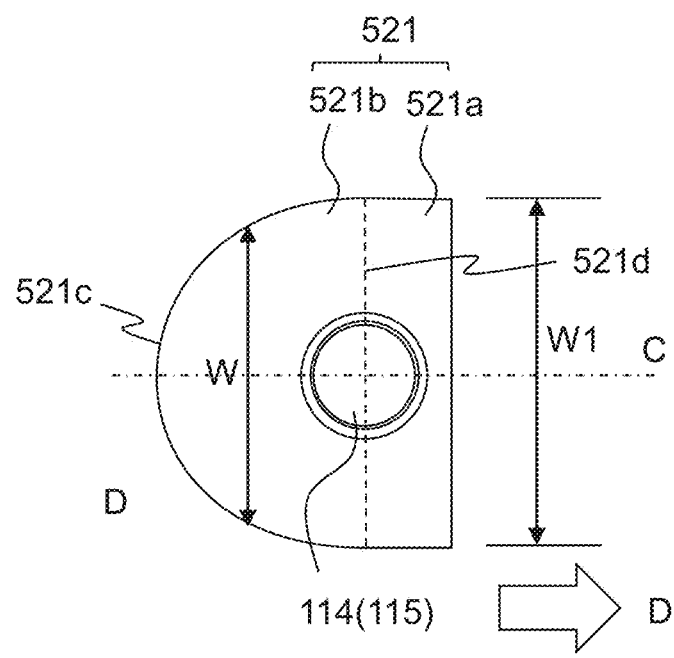
FIG. 16D is a schematic view of the sludge deposition prevention device of the flocculation and sedimentation apparatus according to another modification of the fifth embodiment.

FIGS. 16A to 16D are schematic views of sludge deposition prevention device 520 of flocculation and sedimentation apparatus 500 according to another modification of the fifth embodiment of the present invention. FIG. 16A shows a perspective view of the vicinity of raw water supply port 115 of raw water supply mechanism 510, FIG. 16B shows an exploded perspective view of first pipe portion 114 and sludge deposition prevention device 520 of raw water supply mechanism 510, FIG. 16C shows a cross-sectional view taken along line A-A in FIG. 16A, and FIG. 16D shows a top view of first pipe portion 114 and sludge deposition prevention device 520, as viewed from direction B in FIG. 16A. The present embodiment is the same as sludge deposition prevention device 520 according to the embodiment shown in FIGS. 11A and 11B except for the shape of second plate member 521. Second plate member 521 has front portion 521a that is located on the forward side with regard to moving direction D of raw water supply port 115, and rear portion 521b that is located on the backward side with regard to moving direction D of raw water supply ports 115 and that is connected to front portion 521a at boundary portion 521d. Front portion 521a has a generally rectangular shape, and rear portion 521b has a semicircular shape having a diameter equal to width W1 of front portion 521a (a width in a direction orthogonal to moving direction D of raw water supply port 115). Front portion 521a and rear portion 521b are integrally formed, and the center of raw water supply port 115 lies on boundary portion 521d between front portion 521a and rear portion 521b. Thus, rear edge portion 521c of rear portion 521b coincides with the arc of a circle having a center at the center of raw water supply port 115, and rear edge portion 521c is located equidistant from the center of raw water supply port 115. In other words, width W of second plate member 521 decreases in a direction opposite to moving direction D of raw water supply ports 115 and away from the center of raw water supply port 115. Here, width W is a dimension of rear portion 521b in a direction orthogonal to moving direction D of raw water supply ports 115 and parallel to bottom 102a of sedimentation tank 102.

As described above, raw water that is supplied from raw water supply port 115 collides against bottom 102a of sedimentation tank 102 and changes to an upward flow. However, the upward flow is generated immediately behind raw water supply port 115 with regard to moving direction D of raw water supply ports 115, as indicated by arrow F in FIG. 11C. This means that the upward flows are generated substantially along moving line C. Since second plate member 521 of the present embodiment has rear portion 521b whose width W decreases in a direction away from the center of raw water supply port 115, the upward flow is distributed to both sides of moving line C, in addition to immediately behind raw water supply port 115 with regard to moving direction D. The raw water that exits raw water supply port 115 moves in a direction away from raw water supply port 115 along the lower surface of rear portion 521b, and is distributed to sedimentation tank 102 in an upward flow from rear edge portion 521c of rear portion 521b, as indicated by arrow F in FIG. 16C. The distance from the center of raw water supply port 115 to rear edge portion 521c that is not on moving line C is equal to the distance from the center of raw water supply port 115 to rear edge portion 521c on moving line C. Thus, the upward flow is generated quite uniformly along rear edge portion 521c of rear portion 521b. The shape of rear portion 521b is not limited to the semicircular shape, and may be an elliptical shape, a triangular shape, or the like.

The fifth embodiment is not limited to these. For example, sludge concentration tank 103 is provided at the center of sedimentation tank 102 in the above-mentioned embodiment, but sludge concentration tank 103 may be provided side by side with sedimentation tank 102. Alternatively, sludge concentration tank 103 may be integrated with sedimentation tank 102, and a lower portion of sedimentation tank 102 may be used as a sludge concentration portion.

Figure 17:
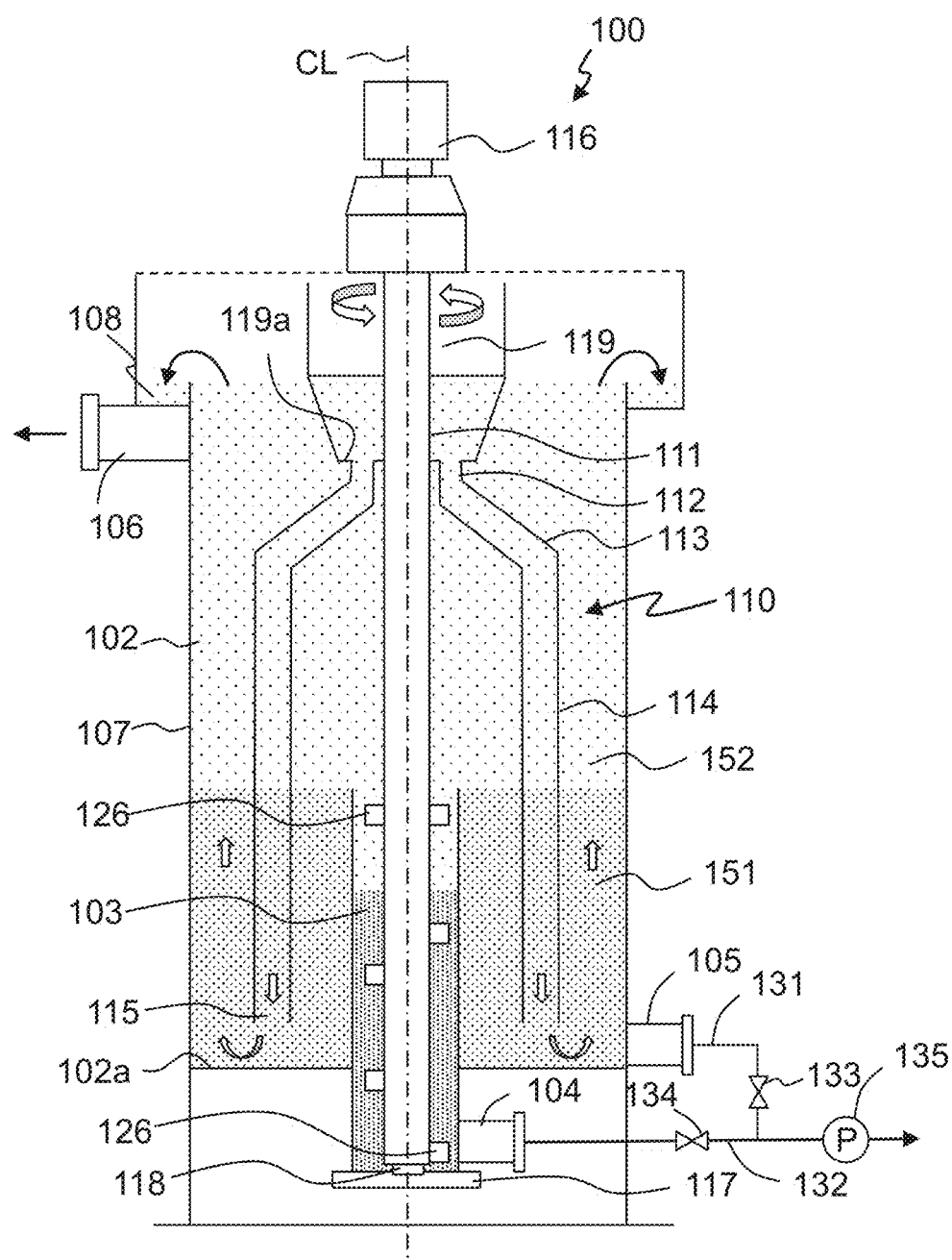
FIG. 17 is a schematic cross-sectional view of the flocculation and sedimentation apparatus showing a modification of the first pipe portion.

FIG. 17 is a schematic cross-sectional view of a flocculation and sedimentation apparatus that shows a modification of the first pipe portion. Base plate 119a having a generally horizontal ring-shape is formed at the lower end of raw water introducing portion 119, and first pipe portion 112 is connected to base plate 119a. As compared to a structure where first pipe portion 112 is connected to the side wall of raw water introducing portion 119, sludge is less likely to clog the inlet of first pipe portion 112 because sludge is less likely to be deposited on the bottom of raw water introducing portion 119. First pipe portion 112 and the upper part of second pipe portion 113 may be formed as a 45° elbow in order to further improve productivity (weldability) from the first embodiment. In addition, since first pipe portion 112 extends vertically, the upper end of second pipe portion 113 that is connected to first pipe portion 112 is visible from raw water introducing portion 119. A pipe cleaning instrument, such as a high-pressure cleaning machine or a pipe hose cleaner, can be easily inserted into second pipe portion 113 and third pipe portion 114 from raw water introducing portion 119 through first pipe portion 112. Accordingly, pipe portions 112, 113 and 114 can be easily cleaned, and maintainability is improved.

Although preferred embodiments of the present invention have been illustrated and described in detail, it should be understood that various changes and modifications can be made without departing from the spirit or the scope of the accompanying claims.

The invention claimed is:
1. A flocculation and sedimentation apparatus comprising:
   a sedimentation tank that causes flocs in raw water to be sedimented and separated;
   a sludge concentration tank that is surrounded by the sedimentation tank and that collects and concentrates the flocs by allowing the flocs to overflow from the sedimentation tank; and
   a raw water supply mechanism having a center line that passes through the sludge concentration tank, wherein the raw water supply mechanism rotates about the center line and supplies the raw water to the sedimentation tank,
   wherein the raw water supply mechanism comprises:
      a raw water introducing portion that is located on the center line and to which the raw water is introduced,
      a raw water supply port that is open at a lower portion of an inner space of the sedimentation tank and that supplies the raw water to the sedimentation tank,
      a pipe portion that communicates both with the raw water introducing portion and with the raw water supply port and that extends above the sludge concentration tank in a direction away from the center line, and
      a rotating shaft that is concentric with the center line,
   wherein the pipe portion further comprises:
      a first pipe portion having the raw water introducing portion, wherein the first pipe portion is fixed to the rotating shaft;
      at least one second pipe portion that is connected to the first pipe portion and that extends in a direction away from the center line above the sludge concentration tank; and
      a third pipe portion having the raw water supply port, wherein the third pipe portion is connected to the second pipe portion, and wherein a third agitating blade that agitates the raw water is provided on an outer circumferential surface of the third pipe portion of the raw water supply mechanism.

2. The flocculation and sedimentation apparatus according to claim 1, further comprising a fixed blade that is attached to at least one wall surface from among an inner wall surface of the sedimentation tank and an outer wall surface of the sludge concentration tank.

3. The flocculation and sedimentation apparatus according to claim 2, wherein the third agitating blade and the fixed blade are alternately arranged in a vertical direction.

4. The flocculation and sedimentation apparatus according to claim 1, wherein a plurality of the third agitating blades is provided.

5. The flocculation and sedimentation apparatus according to claim 1, wherein the first pipe portion is connected to a bottom of the raw water introducing portion and extends in a vertical direction.

6. The flocculation and sedimentation apparatus according to claim 1, wherein the raw water supply port is movable along a bottom of the sedimentation tank, and
the raw water supply mechanism comprises a first plate member that is provided ahead of the raw water supply port with regard to a moving direction of the raw water supply port, and the first plate member extends downward from the raw water supply port or extends diagonally downward from the raw water supply port.

7. The flocculation and sedimentation apparatus according to claim 6, further comprising a second plate member that extends above the first plate member at an angle relative to the first plate member and that surrounds the raw water supply port.

8. The flocculation and sedimentation apparatus according to claim 7, wherein the first plate member lies in a vertical plane, and the second plate member lies in a horizontal plane.

9. The flocculation and sedimentation apparatus according to claim 7, wherein at least one of the plate members from among the first plate member and the second plate member is inclined relative to a horizontal plane and relative to a vertical plane.

10. The flocculation and sedimentation apparatus according to claim 7, wherein a width of the second plate member in a direction orthogonal to the moving direction of the raw water supply port decreases in a direction opposite to the moving direction of the raw water supply port and away from a center of the raw water supply port.

11. The flocculation and sedimentation apparatus according to claim 7, further comprising a third plate member that is connected to a lower end of the first plate member and that faces the second plate member.

12. The flocculation and sedimentation apparatus according to claim 6, wherein the first plate member protrudes farther in the moving direction of the raw water supply port at a central portion thereof with regard to a width direction than at both ends with regard to the width direction.

13. The flocculation and sedimentation apparatus according to claim 6, wherein the first plate member has an extension that surrounds the raw water supply port, and the first plate member, including the extension, extends forward in the moving direction and diagonally downward, as a whole.

14. A flocculation and sedimentation apparatus comprising:
a sedimentation tank that causes flocs in raw water to be sedimented and separated;
a sludge concentration tank that is surrounded by the sedimentation tank and that collects and concentrates the flocs by allowing the flocs to overflow from the sedimentation tank; and
a raw water supply mechanism having a center line that passes through the sludge concentration tank, wherein the raw water supply mechanism rotates about the center line and supplies the raw water to the sedimentation tank,
wherein the raw water supply mechanism comprises:
a raw water introducing portion that is located on the center line and to which the raw water is introduced,
a raw water supply port that is open at a lower portion of an inner space of the sedimentation tank and that supplies the raw water to the sedimentation tank,
a pipe portion that communicates both with the raw water introducing portion and with the raw water supply port and that extends above the sludge concentration tank in a direction away from the center line, and
a rotating shaft that is concentric with the center line, wherein the pipe portion further comprises:
a first pipe portion having the raw water introducing portion, wherein the first pipe portion is fixed to the rotating shaft;
at least one second pipe portion that is connected to the first pipe portion and that extends in a direction away from the center line above the sludge concentration tank; and
a third pipe portion having the raw water supply port, wherein the third pipe portion is connected to the second pipe portion, and
wherein the rotating shaft extends in the sludge concentration tank, and a first agitating blade that agitates or scrapes sludge in the sludge concentration tank is provided at a portion of an outer circumferential surface of the rotating shaft that is located in the sludge concentration tank.

15. The flocculation and sedimentation apparatus according to claim 14, wherein the first pipe portion is supported by the rotating shaft such that the first pipe portion envelops a part of the outer circumferential surface of the rotating shaft, and a second agitating blade that agitates the raw water is provided at a portion of the outer circumferential surface of the rotating shaft that is adjacent to the part of the outer circumferential surface of the rotating shaft that is enveloped by the first pipe portion.

16. The flocculation and sedimentation apparatus according to claim 14, wherein the first pipe portion is connected to a bottom of the raw water introducing portion and extends in a vertical direction.

\* \* \* \* \*